US009369489B2

(12) United States Patent
Kato

(10) Patent No.: US 9,369,489 B2
(45) Date of Patent: Jun. 14, 2016

(54) MANAGEMENT DEVICE, MANAGEMENT SYSTEM, CONTROL METHOD, AND STORAGE MEDIUM

(71) Applicant: CANON KABUSHIKI KAISHA, Tokyo (JP)

(72) Inventor: Kazunori Kato, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 78 days.

(21) Appl. No.: 14/197,676

(22) Filed: Mar. 5, 2014

(65) Prior Publication Data
US 2014/0298483 A1 Oct. 2, 2014

(30) Foreign Application Priority Data

Apr. 2, 2013 (JP) ................. 2013-076533

(51) Int. Cl.
H04L 29/06 (2006.01)
G06F 21/62 (2013.01)
G06F 21/60 (2013.01)

(52) U.S. Cl.
CPC ............... *H04L 63/20* (2013.01); *H04L 63/10* (2013.01); *G06F 21/604* (2013.01); *G06F 21/6218* (2013.01); *G06F 2221/2141* (2013.01); *G06F 2221/2145* (2013.01); *H04L 63/0884* (2013.01)

(58) Field of Classification Search
CPC ............ G06F 21/6218; G06F 2221/2141; G06F 21/604; G06F 2221/2145; H04L 63/10; H04L 63/0884
USPC ........................................................ 726/27
See application file for complete search history.

(56) References Cited

U.S. PATENT DOCUMENTS

2003/0115179 A1* 6/2003 Prabakaran et al. ............... 707/1
2003/0154403 A1* 8/2003 Keinsley et al. ............. 713/201
2005/0268090 A1* 12/2005 Saw et al. ..................... 713/156
2007/0005435 A1* 1/2007 Murase et al. .................. 705/26
2009/0119672 A1* 5/2009 Bussard et al. ............... 718/104
2013/0246528 A1* 9/2013 Ogura .......................... 709/204

FOREIGN PATENT DOCUMENTS

JP 2010-108170 A 5/2010

OTHER PUBLICATIONS

Rainer Steffen and Rudi Knorr, A trust based delegation system for managing access control, 2005, Advances in Pervasive Computing, pp. 1-5, downloaded from http://www.pervasive.ifi.lmu.de/adjunct-proceedings/poster/p001-005.pdf on Feb. 8, 2016.*

* cited by examiner

Primary Examiner — Chau Le
Assistant Examiner — Gary Lavelle
(74) Attorney, Agent, or Firm — Fitzpatrick, Cella, Harper & Scinto

(57) ABSTRACT

Provided is a management device that manages trust relationship information between service providing devices and trust relationship information between a holding device and a service providing device. When the management device determines, based on the acquired trust relationship information, that a second service providing device trusts a first service providing device, the holding device trusts the first service providing device, and the holding device trusts the second service providing device, the management device sets a transfer of access rights to the holding device held by the first service providing device to the second service providing device.

9 Claims, 35 Drawing Sheets

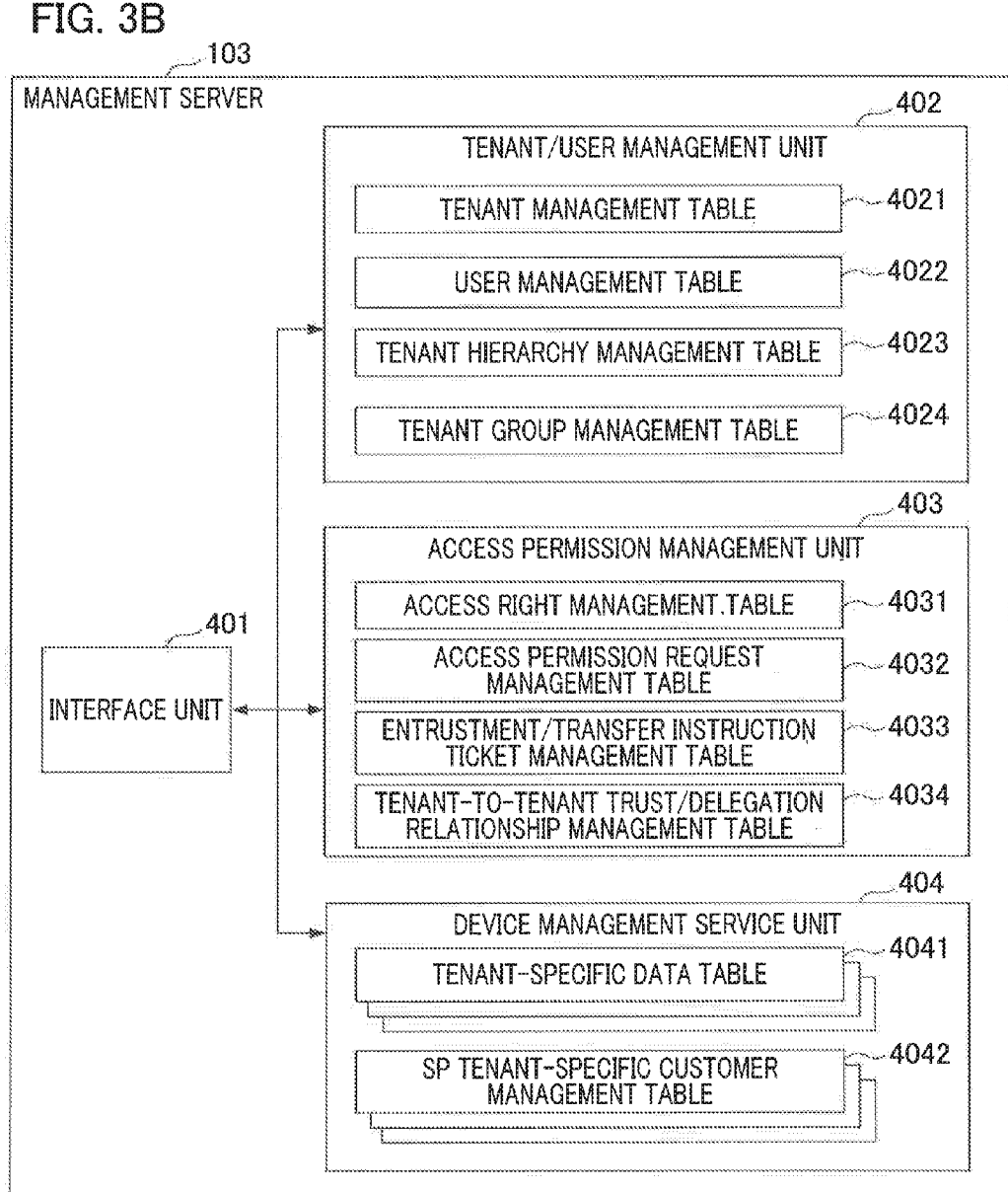

FIG. 4A

| | Tenant ID | Tenant type | Administrator ID |
|---|---|---|---|
| 511 | SP_US | Service provider | tony |
| 512 | SP_US1 | Service provider | aaa |
| 513 | SP_JP | Service provider | kato |
| 514 | SP_AS | Service provider | ddd |
| 515 | SP_EU | Service provider | efe |
| 516 | SP_UK | Service provider | www |
| 517 | SP_London | Service provider | weer |
| 518 | ABC_Corp | Customer | admin |
| 519 | ABC_US | Customer | sara |
| 520 | ABC_JP | Customer | suzuki |
| 521 | ABC_London | Customer | bridge |
| 522 | ABC_AS | Customer | choi |

| | Tenant ID | User ID | Password |
|---|---|---|---|
| 611 | SP_US | tony | xxxxxx |
| 612 | SP_JP | kato | yyyyy |
| 613 | ABC_Corp | admin | zzzzzz |
| 614 | ABC_JP | suzuki | zzzzzz |
| 615 | SP_UK | www | zzzzzz |
| 616 | SP_London | weer | zzzzzz |
| 617 | ABC_London | bridge | dfdfdfd |

| | Upper tenant | Lower tenant |
|---|---|---|
| | 701 | 702 |
| 711 | SP_ROOT | SP_US |
| 712 | SP_ROOT | SP_JP |
| 713 | SP_ROOT | SP_EU |
| 714 | SP_ROOT | SP_AS |
| 715 | SP_US | SP_US1 |
| 716 | SP_EU | SP_UK |
| 717 | SP_UK | SP_London |
| 718 | ABC_Corp | ABC_US |
| 719 | ABC_Corp | ABC_JP |
| 720 | ABC_Corp | ABC_London |
| 721 | ABC_Corp | ABC_ASIA |

| | Tenant ID | Belonging group |
|---|---|---|
| | 801 | 802 |
| 811 | SP_UK | UK_Group |
| 812 | SP_London | UK_Group |
| 813 | SP_US | US_Group |
| 814 | SP_US1 | US_Group |

| | Owner tenant | User tenant | Permitted right |
|---|---|---|---|
| 911 | ABC_Corp | SP_US | Device management right |
| | | | Count/report creation right |
| | | | Integrated report creation right |
| 912 | ABC_JP | SP_US | Device management right |
| | | | Count/report creation right |
| | | | Integrated report creation right |
| 913 | ABC_JP | SP_JP | Device management right |
| | | | Count/report creation right |
| 914 | ABC_JP | ABC_Corp | Report reference right |
| | | | Device management right |
| 915 | ABC_US | SP_US | Report reference right |
| | | | Device management right |
| | | | Integrated report creation right |

| | Owner tenant | Permitting request/ user tenant | Permitted right |
|---|---|---|---|
| 1011 | ABC_Corp | SP_US | Device management right |
| | | | Count/report creation right |
| | | | Integrated report creation right |
| 1012 | ABC_JP | SP_US | Device management right |
| | | | Count/report creation right |
| | | | Integrated report creation right |

FIG.6A

| Ticket No. | Instructor | Owner | User | Target right | Pass phrase | Owner-to-instructor trust/delegation relationship | Owner-to-user trust/delegation relationship | User-to-instructor trust relationship | Entrustment mediator tenant |
|---|---|---|---|---|---|---|---|---|---|
| UC1 | SP_US | ABC_JP | SP_JP | Device management / Count/report creation | 1111111111 | OK | OK | OK | |
| UC2 | SP_US | ABC_US | SP_US1 | Device management | qwer57rt | OK | OK | OK | |
| UC3 | SP_US | ABC_London | | Device management / Count/report creation | dfafds | OK | NG | NG | SP_UK |
| UC4 | SP_AS | ABC_AS | SP_US | Device management / Count/report creation / Integrated report creation | ererr343 | OK | OK | NG | |

FIG.6B

| | Subject | Trust/Delegation | Target |
|---|---|---|---|
| 1211 | ABC_Corp | Trust | SP_US |
| 1212 | ABC_JP | Trust | SP_US |
| 1212 | ABC_US | Delegation | SP_US |
| 1213 | SP_JP | Trust | SP_EU |
| 1214 | SP_US | Trust | SP_EU |
| 1215 | SP_EU | Trust | SP_US |

4041 Table_name=ABC_JP.device_info

| | 1301 Device ID | 1302 IP address | 1303 Installed location |
|---|---|---|---|
| 1311 | 12345AAA | 172.24.2.122 | Setagaya office 1F |
| 1312 | 23456BDS | 172.24.2.156 | Setagaya office 2F |
| 1313 | 43424GAG | 172.24.2.134 | Kamata office 3F |

| | 3601 Customer tenant ID | 3602 Service status |
|---|---|---|
| 3611 | ABC_Corp | Providing |
| 3612 | ABC_US | Providing |
| 3613 | ABC_London | Not yet started |
| 3614 | ABC_JP | Not yet started |

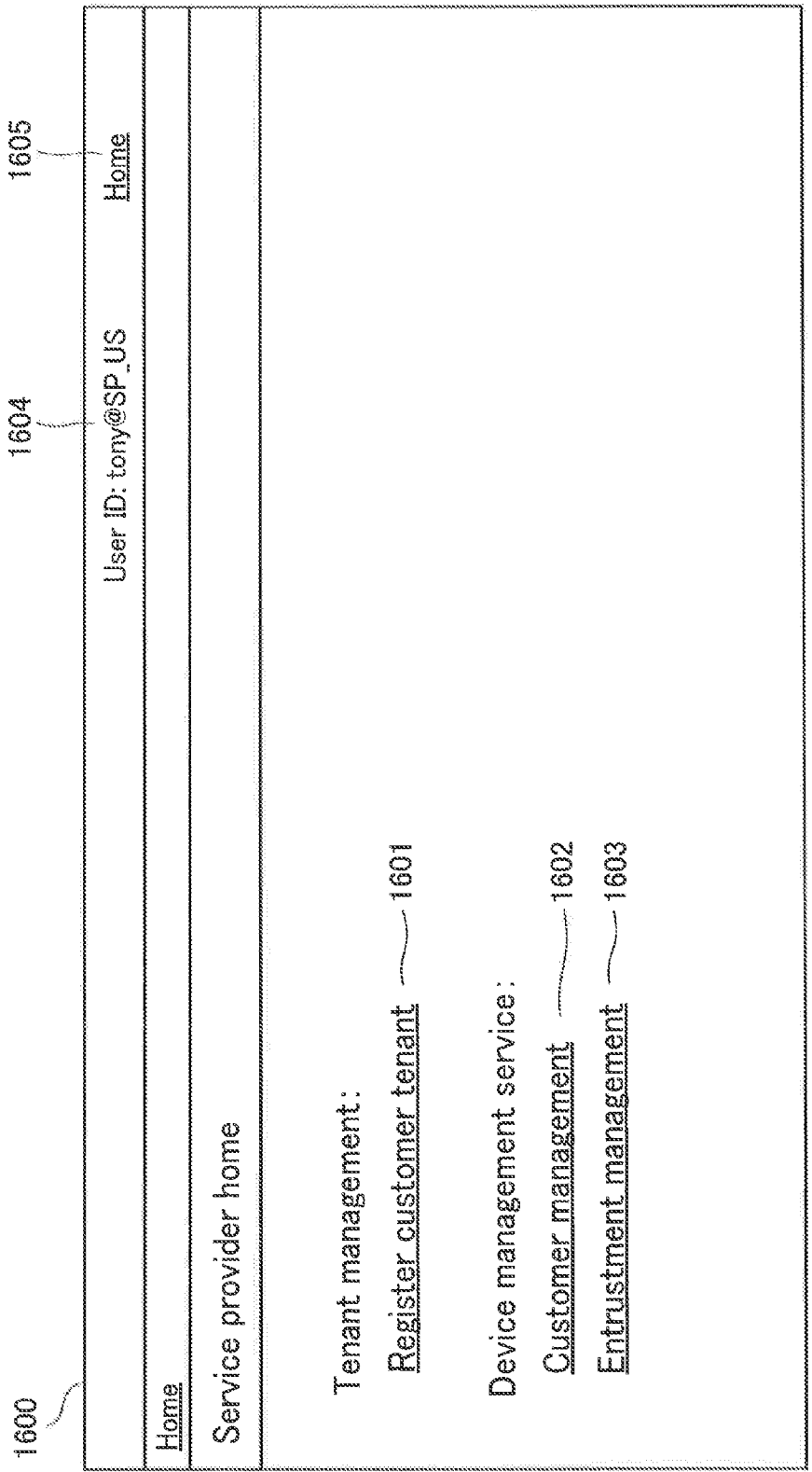

Home > Tenant management > Add customer tenant

User ID: tony@SP_US     Home

Register customer tenant (1/2)

Input information about tenant to be registered.

Tenant information

| Administrator's user ID | suzuki | — 1711 |
| Administrator's password | ******** | — 1712 |
| Upper customer's tenant ID | ABC_Corp | — 1713 |

Register — 1714    Cancel — 1715

| Home > Add customer tenant | User ID: tony@SP_US | Home |

Customer tenant registration results

Customer tenant has been registered.

Information about registered tenant

| Tenant ID | ABC_JP | ~1721 |
| Administrator's user ID | suzuki | ~1722 |
| Upper customer's tenant ID | ABC_Corp | ~1723 |

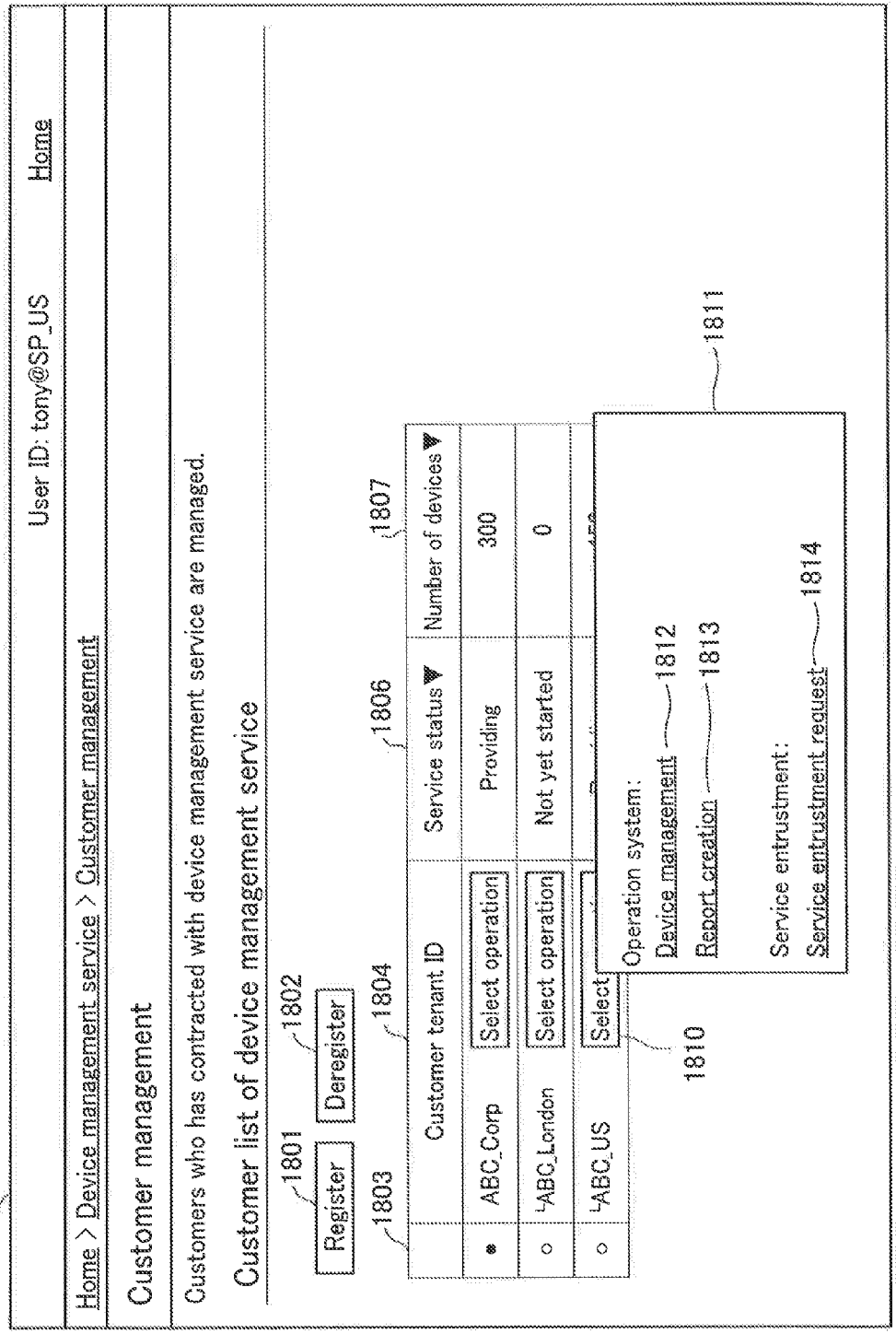

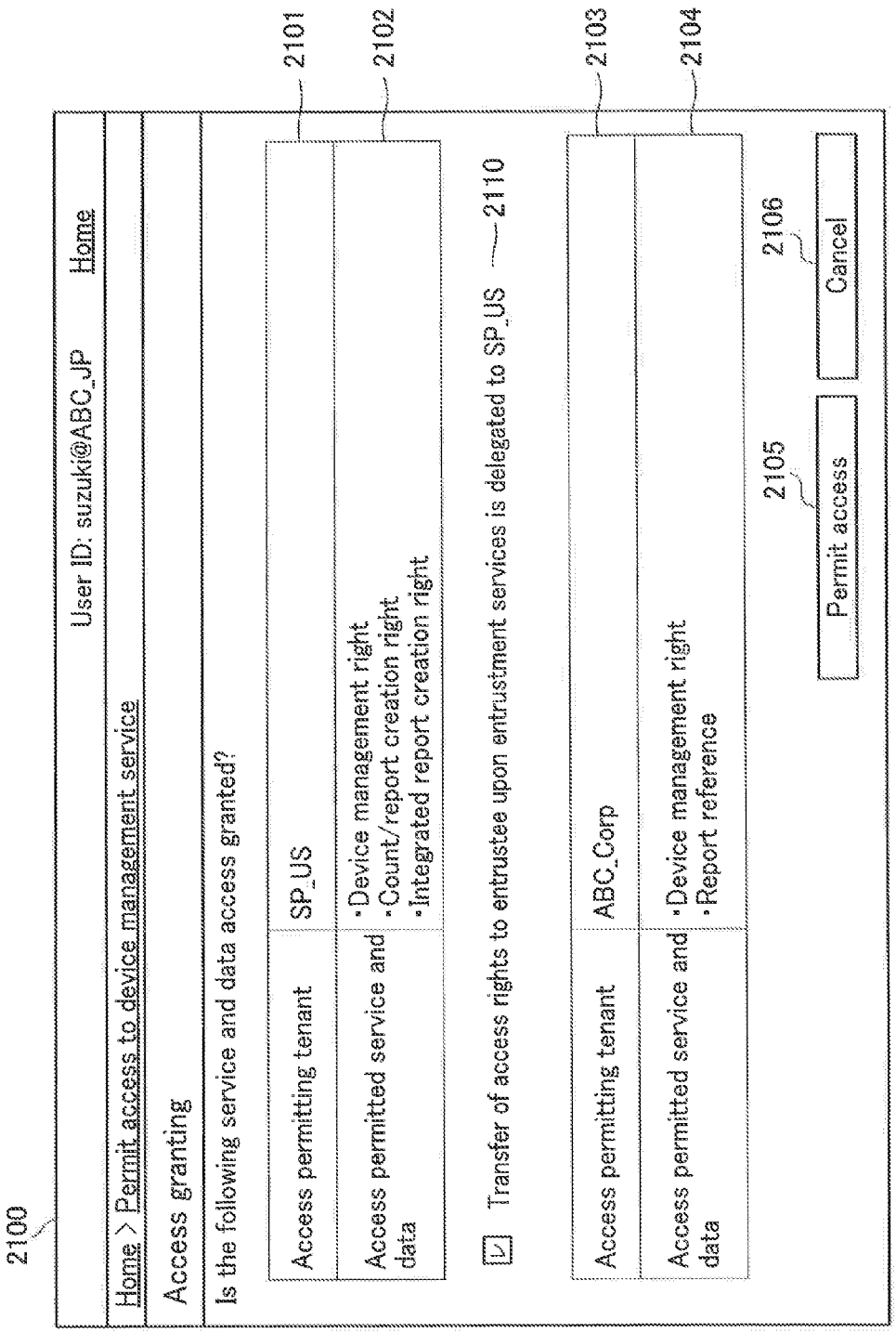

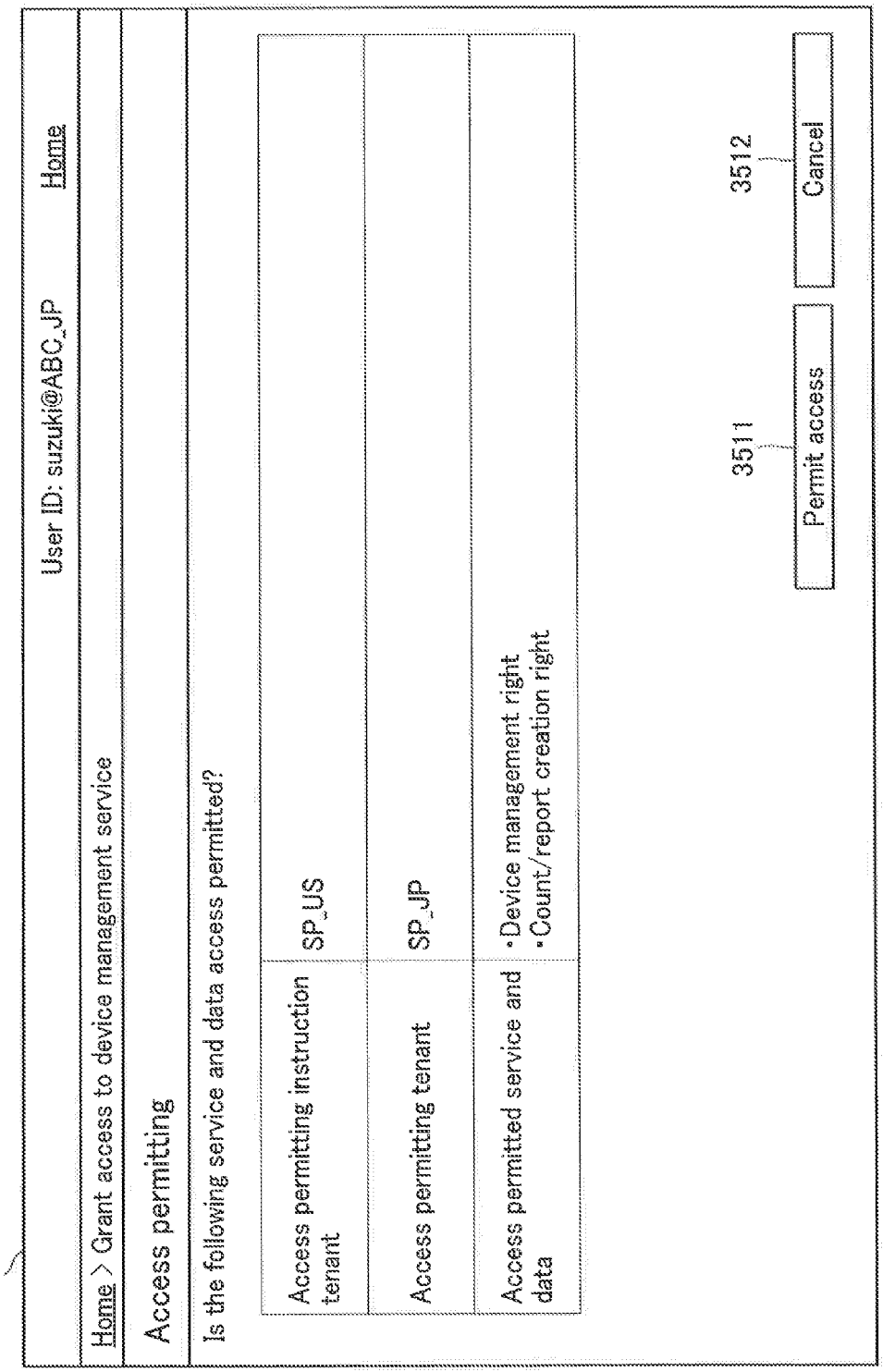

FIG. 14A

Home > Device management service > Service entrustment management

Service entrustment management

Status of service entrustment is managed.
Customer list

Select customer list:
[Customer list to be entrusted ▼] [Apply]

[Add service entrustment]   [Add service entrustment intermediary]

| Customer tenant ID | Entrustee's SP tenant ID | Entrustment intermediary's SP tenant ID | Service entrustment acceptance status | Entrusted service |
|---|---|---|---|---|
| ABC_US | SP_US1 | | Waiting for SP acceptance | 1 case |
| ABC_JP | SP_JP | | Accepted [Remove >] | 2 cases |
| ABC_London | SP_London | SP_EU, SP_UK | Waiting for customer acceptance | 2 cases |

User ID: tony@SP_US    Home

FIG. 14B

Home > Device management service > Service entrustment management

Service entrustment management

Status of service entrustment is managed.
Customer list

Select customer list:
[Entrusted customer list ▼] [Apply] ~2202

| Customer tenant ID | Entrustee's SP tenant ID | Entrustment intermediary's SP tenant ID | Service entrustment acceptance status | Entrusted service |
|---|---|---|---|---|
| ABC_JP | SP_US | | Waiting for SP acceptance [Accept>] | 2 cases |
| ABC_London | SP_US | | Waiting for SP acceptance [Accept>] | Entrustment intermediary request |

User ID: kato@SP_JP     Home

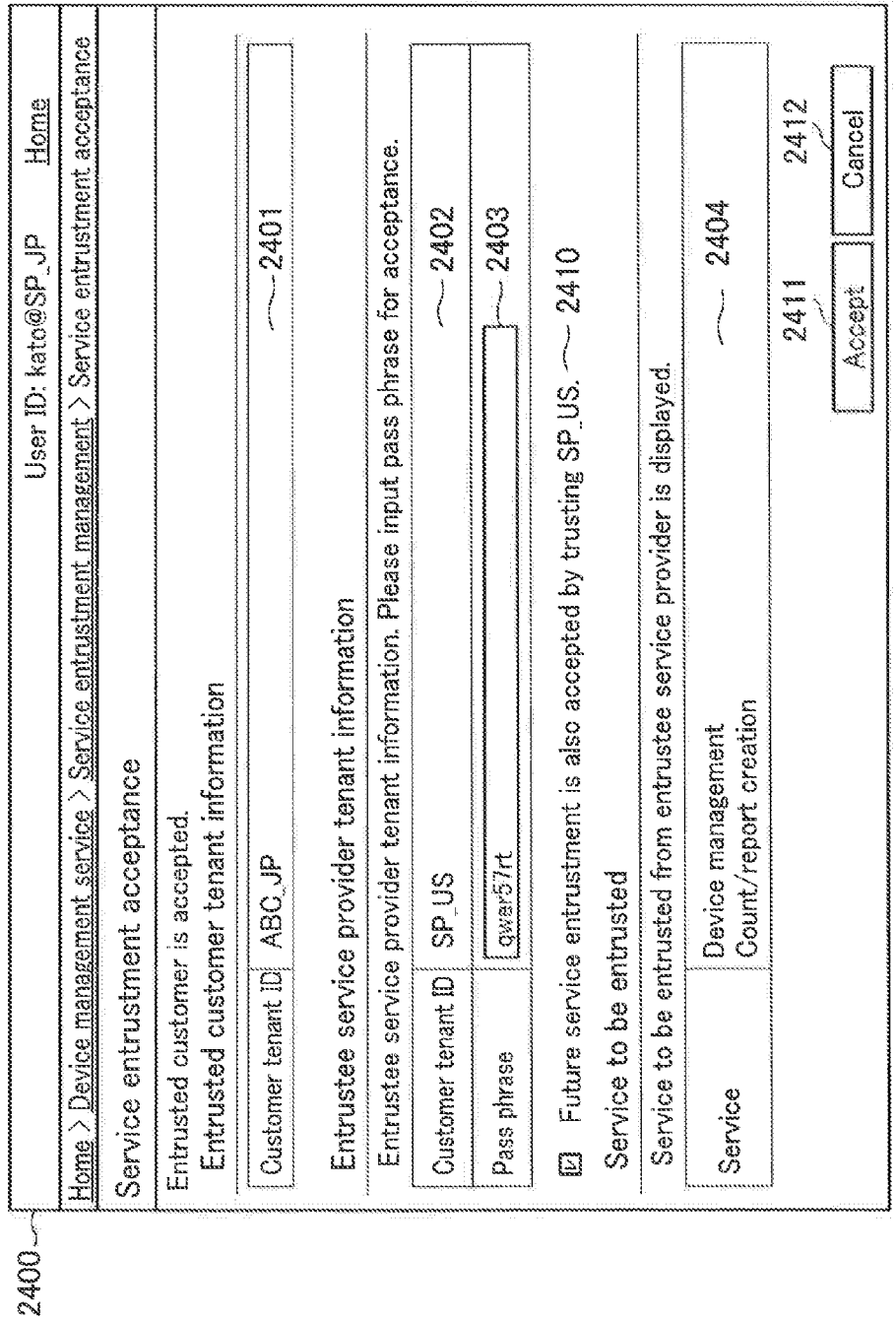

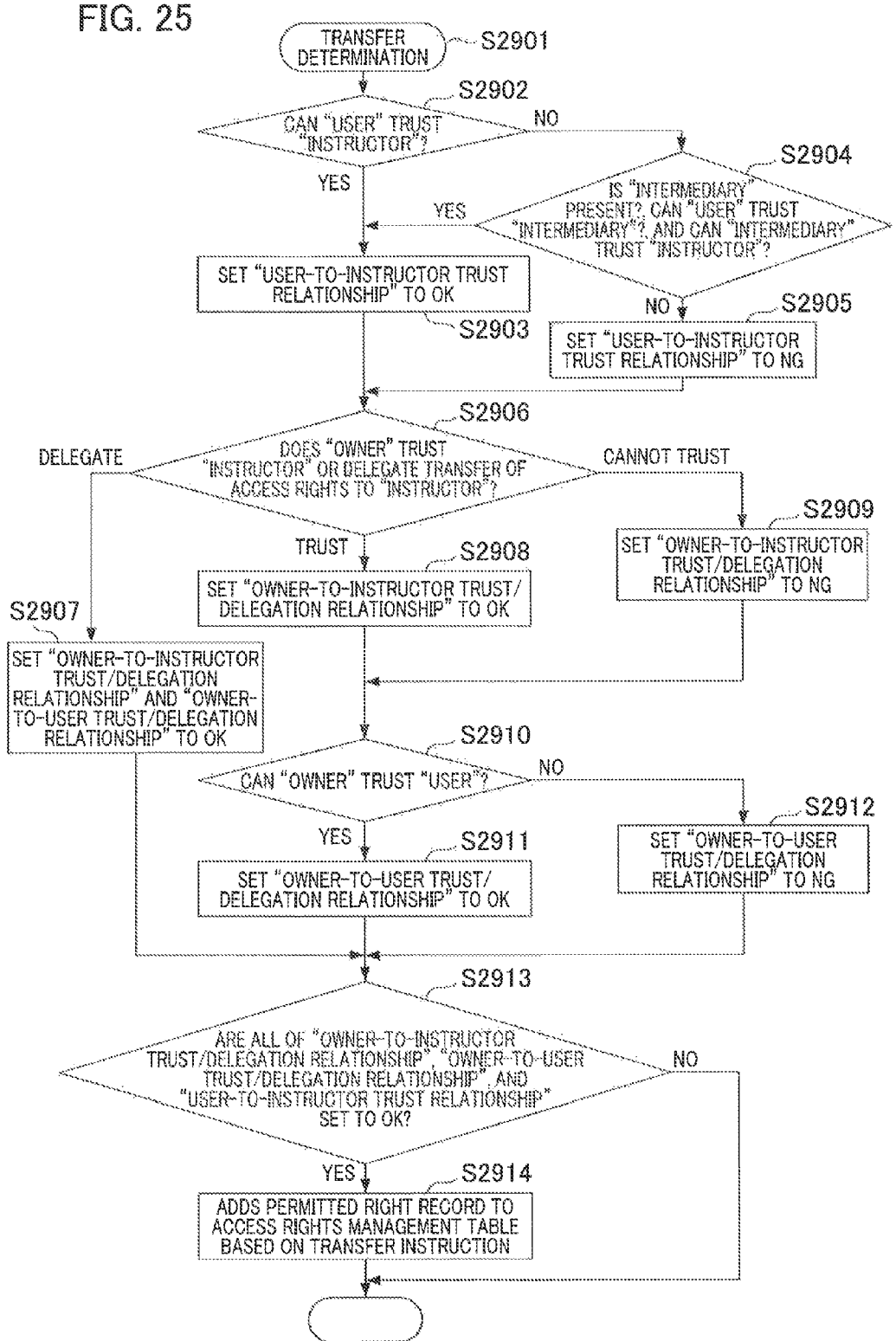

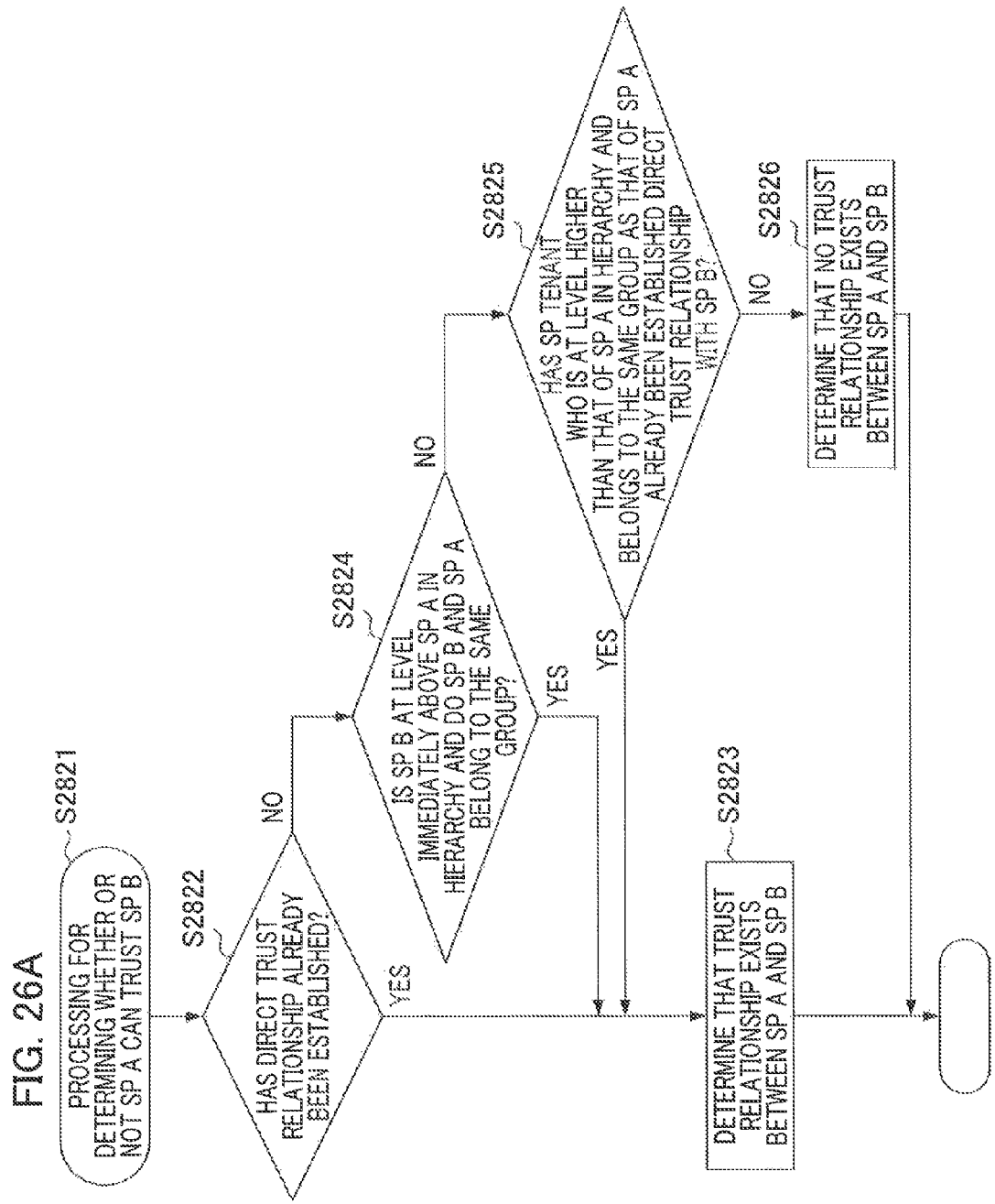

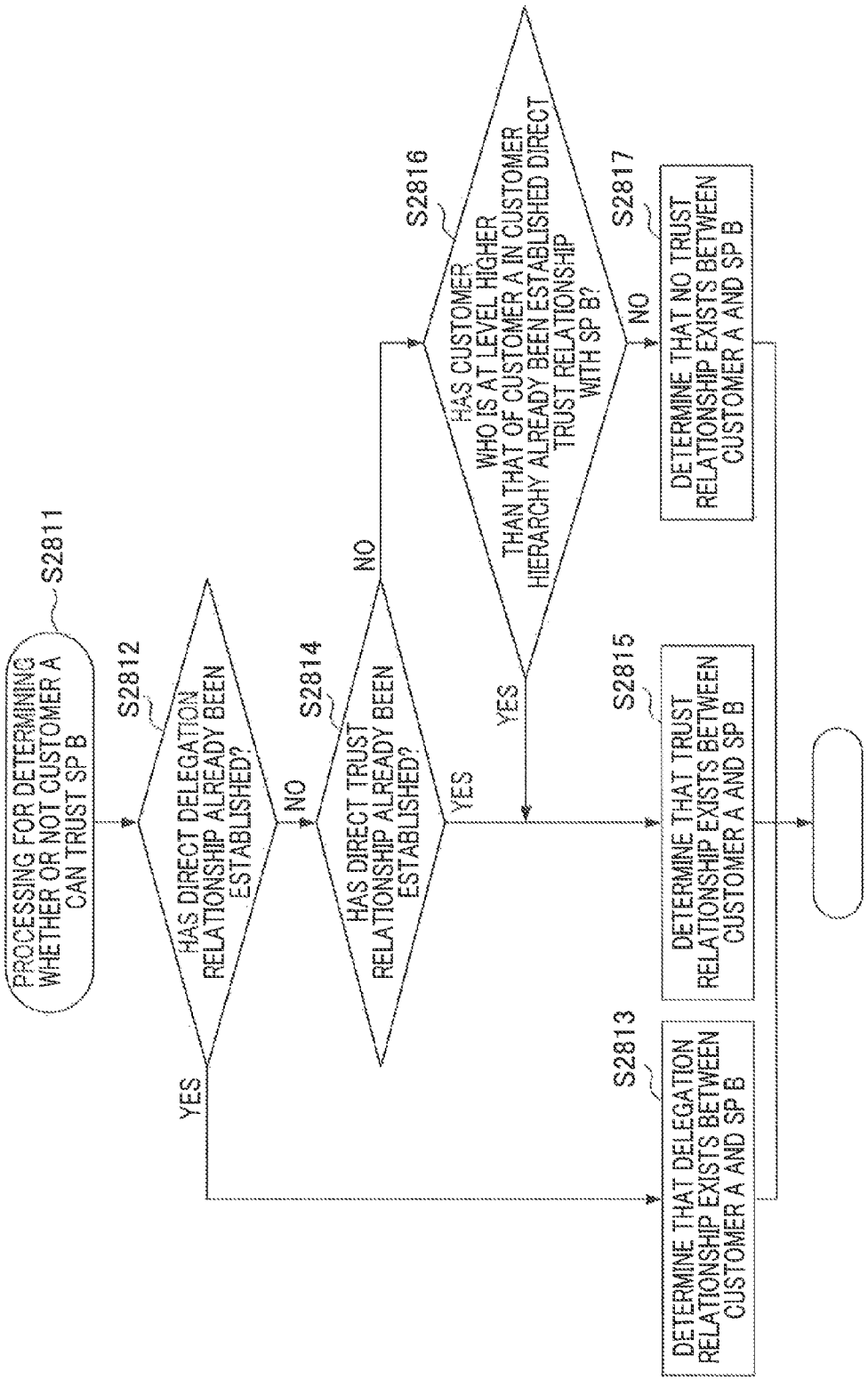

MANAGEMENT DEVICE, MANAGEMENT SYSTEM, CONTROL METHOD, AND STORAGE MEDIUM

BACKGROUND OF THE INVENTION

1. Field of the Invention

The present invention relates to a management device, a management system, a control method, and a storage medium.

2. Description of the Related Art

There has been proposed a cloud system in which a service provider manages data owned by customers. The term "service provider" refers to a company which provides various services to customers who use a service provider. In the cloud service, data storage and user information are managed by a tenant which is a dedicated region for each customer. In the cloud service, data is managed in a tenant unit, a service provider can access only data in a tenant to which the service provider itself belongs but is not permitted to access other tenants. However, in order to manage customer data by a service provider to whom customers have entrusted business activities, the service provider needs to access customer data stored in a customer tenant (a tenant owned by a customer). The service provider cannot provide a data management service if the service provider cannot access customer data. Since customer data may include personal information and confidential information, it is required that the service provider can access customer data after being accepted in advance by customers.

Japanese Patent Laid-Open No. 2010-108170 discloses a role-based access control method. In the role-based access control method, a management device permits access from users for each role for each of data items and functions. The management device determines access to a data object and a functional object based on a role set in user identification information.

Assume that a user environment for utilizing a cloud service is the following environment. For example, it is contemplated that a customer who has made a service providing contract with a service provider may be a large-scale company having a plurality of intra-group companies or a global company where its locations are spread over a wide area. In such a case, a single service provider may not realize services to all customers. Thus, the single service provider may entrust services to customers to another service provider (second service provider). In order to secure entrustment, customers to be entrusted are managed by being divided into divided tenants in regional units or in group company units, so that the range of customers to be entrusted can be clarified. Then, access rights are permitted to a second service provider serving as an entrustee for each divided customer tenant, so that services can be entrusted to the second service provider.

However, a second service provider may not have a direct relationship with a tenant for a customer to be entrusted because there exists no service contract therebetween or they have no upper-and-lower relationship in the hierarchical structure. Consequently, from the viewpoints of security, the second service provider cannot obtain direct access rights in order to access data (resource) of a customer to be entrusted.

SUMMARY OF THE INVENTION

The present invention provides a mechanism that entrusts a service to a customer tenant, which is provided by a service provider, to another service provider so as to safely transfer access rights to customer data.

According to an aspect of the present invention, a management device is provided that is communicable with a holding device and a service providing device for providing services using resources to the holding device and manages access rights to the resources relating to the service providing device. The management device includes a managing unit configured to manage trust relationship information between the service providing devices and trust relationship information between the holding device and the service providing device; and a setting unit configured to set a transfer of access rights to the resources held by a first service providing device to a second service providing device. When it is determined, based on the acquired trust relationship information, that the second service providing device trusts the first service providing device, the holding device trusts the first service providing device, and the holding device trusts the second service providing device, the setting unit sets the transfer of the access rights.

Further features of the present invention will become apparent from the following description of exemplary embodiments with reference to the attached drawings.

BRIEF DESCRIPTION OF THE DRAWINGS

FIGS. 3A and 3B illustrate software configurations of the host computer and the management server.

FIGS. 4A to 4D illustrate the configurations of the respective tables managed by the management server.

FIGS. 5A and 5B illustrate the configurations of the respective tables managed by the management server.

FIGS. 6A and 6B illustrate the configurations of the respective tables managed by the management server.

FIGS. 7A and 7B illustrate the configurations of the respective tables managed by the management server.

FIGS. 10A and 10B illustrate examples of home pages for a service provider and a customer.

FIGS. 11A and 11B illustrate examples of screens that are used by a service provider.

FIGS. 12A and 12B illustrate examples of screens that are used by a service provider.

FIGS. 13A and 13B illustrate examples of access permitting acceptance screens that are used by a customer tenant.

FIGS. 14A and 14B illustrate examples of service entrustment management screens that are used by a service provider.

FIG. 16 illustrates an example of a service entrustment acceptance screen that is used by a service provider.

FIG. 25 is a flowchart illustrating the flow of transfer determination processing.

FIGS. 26A and 26B are flowcharts illustrating the flow of trust relationship determination processing.

DESCRIPTION OF THE EMBODIMENTS

Hereinafter, certain embodiments of the present invention will be described in detail with reference to the drawings. Note that the following embodiments are not intended to limit the claims of the present invention. Furthermore, all combinations of the features described in the embodiments are not necessarily indispensable to the solving means of the present invention.

First Embodiment

General Configuration of System

Figure 1:
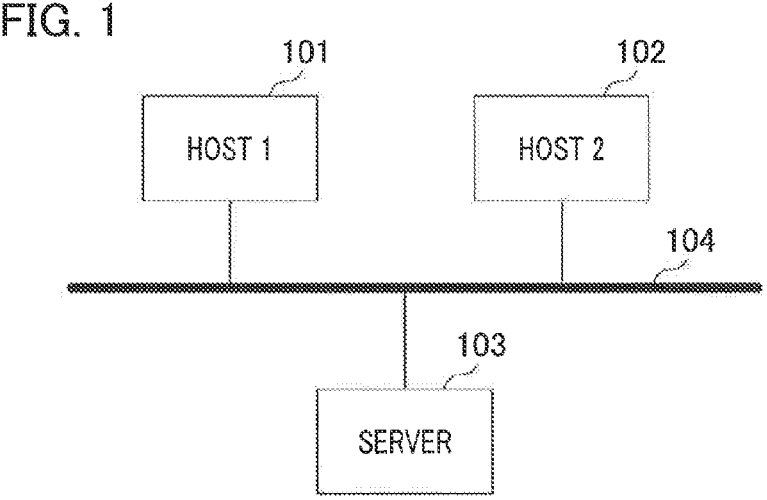
FIG. 1 illustrates a configuration of an access rights management system according to one embodiment of the present invention.

FIG. 1 is a diagram illustrating an exemplary configuration of an information processing system of the present embodiment. A management system that executes access rights management includes host computers 101 and 102 and a management server 103. The host computers 101 and 102 and the management server 103 are communicably connected to each other via a network 104 through known technology such as LAN (Local Area Network), Internet, or the like.

The host computer 101 is a service providing device that is used by a service provider. A user of the service provider uses the service providing device when he/she uses a service provided by a management server 103 using the host computer 101 or operates customer data held in the management server 103. Also, a service provider entrusts services to customers to another service provider. The term "entrustment" used herein refers to the act of making a service providing request from a service provider to another service provider on behalf of the service provider when the service provider who is trusted by its customers cannot provide services to all customers. Also, a service provider registers customer tenants on the management server 103 so as to perform operations such as making a customer data access permitting request, providing an access rights transfer instruction, or the like. For example, when a first service provider entrusts services to customers to a second service provider, the second service provider cannot provide services if the second service provider does not have access rights to customer data from customer tenants. The term "transfer" used herein refers to the act of permitting access rights to customer data from a customer tenant who has received an instruction from the first service provider who has access rights to this customer data to the second service provider.

When the second service provider accepts entrustment from the first service provider or when the customer tenant transfers access rights to the second service provider, a mutual trust relationship is established between the second service provider and the customer tenant. The relationship between the parties when an acceptance instruction such as access permitting, entrustment, or the like is provided from one to another and the another party accepts the instruction is defined as "trust". Likewise, the relationship between the customer tenant and the second service provider when the customer tenant who has received a transfer instruction from the first service provider accepts the instruction is defined as "trust". When the second service provider trusts the first service provider and the customer tenant who has received an instruction from the first service provider having a trust relationship with the second service provider trusts the second service provider, a trust relationship is established among three parties, so that the aforementioned entrustment and transfer can be executed. Note that, when the customer tenant delegates its access rights to the first service provider having a trust relationship with the customer tenant, a trust relationship is established among three parties even if the customer tenant does not trust the second service provider, so that the aforementioned entrustment and transfer can be executed. The term "delegation" refers to delegate a transfer of access rights to the first service provider in the transfer instruction given from the first service provider having a trust relationship with the customer tenant. Thus, even when the customer tenant does not execute access rights transfer processing, the second service provider can acquire access rights to customer data. Although not illustrated, the host computer 101 is present in plural for each service provider group or for each service provider.

The host computer 102 is a holding device which is the owner of data used by customer tenants. The term "customer tenant" refers to a company which is divided in regional units or in group company units and uses a service provider who provides services such as data management or the like. A customer accesses the management server 103 from the host computer 102 and inputs his/her user ID and password for user authentication. Then, the customer uses services provided by the management server 103 or operates customer data held by the management server. The customer also provides an acceptance or rejection instruction for an access permitting request or a right transfer instruction given from the service provider. Although not illustrated, the host computer 102 is present in plural for each customer tenant group or for each customer tenant.

The management server 103 manages a plurality of service provider tenants (hereinafter also referred to as "SP tenant") or customer tenants which are divided in regional units or in group company units so as to manage user information for users who belong to the respective tenants. The management server 103 performs user authentication so as to identify a tenant to which the user belongs. The management server 103 also manages data divided for each tenant. When a user who belongs to a tenant accesses the management server 103, the management server 103 permits access to data of the tenant to which the user belongs. While, in the present embodiment, a description will be given by taking an example in which the management server 103 is constituted by a single server, the functional configuration of the management server may also be separately arranged on a plurality of management servers.

[Hardware Configuration]

Figure 2:
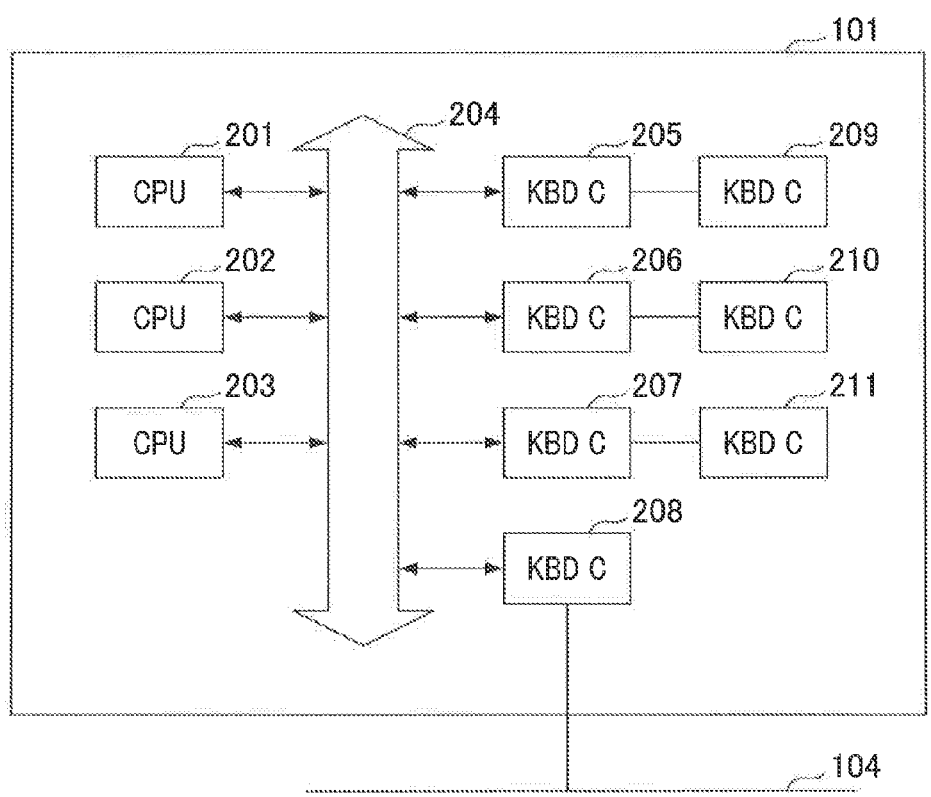
FIG. 2 illustrates hardware configurations of a host computer and a management server.

FIG. 2 is a diagram illustrating exemplary hardware configurations of the host computers 101 and 102 and the management server 103. Each of the host computers 101 and 102 includes a CPU 201, a ROM 202, a RAM 203, a KBDC 205, a DOSPC 206, a DKC 207, an NIC 208, a KBD 209, a DISPLAY 210, and an HD 211, where CPU is an abbreviation for Central Processing Unit, RAM is an abbreviation for Random Access Memory, ROM is an abbreviation for Read Only Memory, and HDD is an abbreviation for Hard Disk Drive.

The CPU 201 executes software stored in the ROM 202 or the hard disk 211 serving as a large-capacity storage device. The CPU 201 generally controls the devices connected to a system bus 204. The RAM 203 functions as a main memory for the CPU 201, a work area, or the like. The keyboard controller 205 (KBDC) controls an instruction input from the keyboard 209 provided in the host computer 101. The display controller 206 (DISPC) controls display on the display module 210 (DISPLAY) constituted by, for example, a liquid crystal display or the like. The disk controller 207 (DKC) controls the hard disk 211 (HD). The network interface card 208 (NIC) performs bidirectional data exchange with other nodes via the network 104.

FIG. 3A is a diagram illustrating exemplary software configurations of the host computers 101 and 102. Each of the host computers 101 and 102 includes a Web browser 301 and an HTTP communication unit 302. The Web browser 301 interprets HTML data, draws a screen on the display module 210, accepts a user operation from a keyboard or the like, and then transmits a request to the HTTP communication unit 302. Upon receiving a communication request from the Web browser 301, the HTTP communication unit 302 communicates with the management server 103 via an image processing device or the like and the NIC 208 through HTTP or HTTPS protocol so as to request a Web page, to receive Web page data, or the like.

FIG. 3B is a diagram illustrating an exemplary software configuration of the management server 103. The management server 103 includes an interface unit 401, a tenant/user management unit 402, an access permission management unit 403, and a device management service unit 404. The interface unit 401 communicates with the host computers 101 and 102 via the NIC 208 and the network 104. Upon receiving a Web page request from a host computer through HTTP/HTTPS, the interface unit 401 determines authentication, access permitting state, or the like and then passes HTML data.

The tenant/user management unit 402 includes a tenant management table 4021, a user management table 4022, a tenant hierarchy management table 4023, and a tenant group management table 4024. The tenant/user management unit 402 performs user authentication processing for each tenant to thereby identify a tenant to which the user belongs.

The access permission management unit 403 includes an access rights management table 4031, an access permission request management table 4032, an entrustment/transfer instruction ticket management table 4033, and a tenant-to-tenant trust/delegation relationship management table 4034. The trust/delegation relationship management table manages a trust/delegation relationship between devices, i.e., a trust/delegation relationship between tenants. The access permission management unit 403 receives information for requesting permission of access to a customer tenant from an SP tenant and manages the received information. The access permission management unit 403 also receives access permitting acceptance information from a customer tenant and manages the received information. The access permission management unit 403 further manages right transfer instruction information from a service provider and checks a trust/delegation relationship for implementing a transfer of rights so as to execute right transfer processing.

The device management service unit 404 includes a tenant-specific data table 4041 and an SP tenant-specific customer management table 4042. The device management service unit 404 provides service functions such as device management, report creation, or the like. Each of the tenant-specific data table 4041 and the SP tenant-specific customer management table 4042 provides a separate table for each tenant and stores data belonging to a tenant corresponding to each table.

For example, a table can be provided for each tenant by setting a table name to <tenant ID>. Of course, a plurality of data tables can be provided for each data type. In this case, a plurality of tables can be provided for each tenant and for each data type by setting a table name to <tenant ID> and each row to <data table name>. As another embodiment, data of all tenants can also be stored in a single table. For example, a tenant ID is stored in one column in a data table so that what data belongs to which tenant can be confirmed by each row.
(Table Configuration)

A description will be given of the configurations of the respective tables managed by the management server 103 with reference to FIGS. 4 to 8.
(Tenant Management Table 4021)

FIGS. 4A to 4D are diagrams illustrating the configurations of the respective tables managed by the tenant/user management unit 402. The tenant management table 4021 shown in FIG. 4A indicates a table for managing the type of tenant. A tenant ID 501 is a column for storing an ID which is used for identifying a tenant. A tenant type 502 is a column for storing information for determining whether or not a tenant is a service provider tenant or a customer tenant. An administrator ID 503 is a column for storing a tenant administrator ID. In the present embodiment, when a tenant to be operated is specified, a request is made to specify a tenant ID and its administrator ID so that it is confirmed whether or not they match and an input error can be prevented. For example, a row 511 indicates a service provider tenant of which the tenant ID is "SP_US" and its administrator ID is "tony".
(User Management Table 4022)

The user management table 4022 shown in FIG. 4B indicates a table for storing information about a user who belongs to a tenant. A tenant ID 601 is a column for storing a tenant ID which is used for identifying a tenant to which the user belongs. A user ID 602 is an ID for identifying a user. A unique ID is used for at least each tenant. A password 603 is a column for storing a password which is input together with a user ID when a user logs in to the management system of the present embodiment. For example, a row 611 indicates a user who belongs to a tenant: SP_US and whose user ID and password are tony and xxxxxx, respectively.
(Tenant Hierarchy Management Table 4023)

Figure 8A:
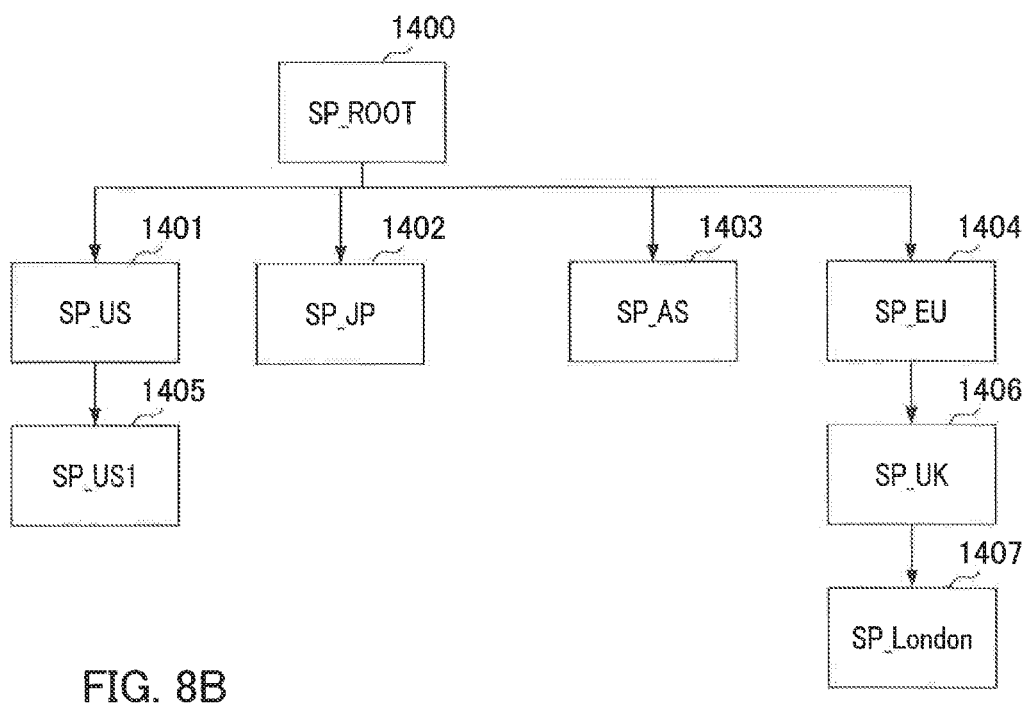
FIGS. 8A and 8B illustrate examples of tenant hierarchical structures.
Figure 8B:
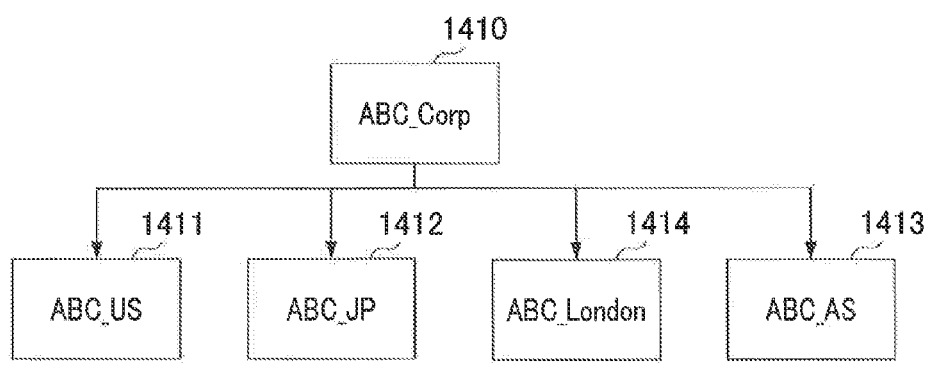

The tenant hierarchy management table 4023 shown in FIG. 4C indicates a table for storing a hierarchical relationship between tenants. A tenant indicated by an upper tenant 701 is positioned in a level higher than that of a tenant indicated by a lower tenant 702. FIG. 8A and FIG. 8B are diagrams illustrating tenant hierarchical structure information between holding devices and between service providing devices, which is expressed by the tenant hierarchy management table 4023 shown in FIG. 4C. A tenant ID is shown in a rectangular frame and an arrow indicates a hierarchical structure from an upper tenant to a lower tenant.
(Tenant Group Management Table 4024)

The tenant group management table 4024 shown in FIG. 4D indicates a table for storing a service provider group to which a service provider tenant belongs. A tenant indicated by a tenant ID 801 belongs to a service provider group indicated by a belonging group 802.

FIGS. 5A and 5B are diagrams illustrating the respective tables managed by the access permission management unit 403.

(Access Rights Management Table 4031)

The access rights management table 4031 shown in FIG. 5A indicates a table for storing access rights to a user tenant held by an owner tenant who owns resources such as data. An owner tenant 901 is a column for storing a tenant ID of a tenant who owns resources such as data. A user tenant 902 is a column for storing an ID of a tenant who has access rights to a tenant indicated by the owner tenant 901.

A permitted right 903 is a column for storing the type of access rights to a user tenant held by an owner tenant who owns resources such as data. When there is a plurality of access rights, the access rights management table 4031 stores a plurality of access rights for each data type. When an owner tenant has access rights to plural types of organized data, the access rights management table 4031 can also store a right set name indicating a set of access rights to the plurality of data. For example, the number of scans counting right, a report creation right, an integrated report creation right, and the like may also be integrally stored as plural types of data by setting a right set name to <scan information>.

(Access Permission Request Management Table 4032)

The access permission request management table 4032 shown in FIG. 5B indicates a table for storing a tenant who owns resources such as data and a right content to be requested by a tenant who makes an access permitting request to the tenant. An owner tenant 1001 is a column for storing a tenant ID of a tenant who owns resources such as data. A permitting request/user tenant 1002 is a column for storing an ID of a tenant who requests access rights to a tenant indicated by the owner tenant 1001. An access permitting request 1003 is a column for indicating the fact that the permitting request/user tenant 1002 requests access rights to which type of data. When data or a right set desired to be accessed is present in plural, the access permission management unit 403 stores the types of these data or right sets in plural. For example, a row 1011 indicates that SP_US serving as a service provider tenant requests data services for a customer tenant ABC_Corp to transfer access rights including a device management right, a count/report creation right, and an integrated report creation right.

(Entrustment/Transfer Instruction Ticket Management Table 4033)

The entrustment/transfer instruction ticket management table 4033 shown in FIG. 6A is a table for storing information relating to a service entrustment instruction or a right transfer instruction. For example, the entrustment/transfer instruction ticket management table 4033 manages trust relationship information between service providing devices serving as service providers and trust relationship information between a customer tenant and a service provider. A ticket No. 1101 is a management number for uniquely identifying an entrustment/transfer instruction ticket. An instructor 1102 indicates a tenant who provides an instruction for a transfer of access rights. An owner 1103 indicates a tenant who transfers access rights to a user tenant. A user 1104 indicates a tenant who can access tenant data owned by the owner 1103 upon receiving access rights. A target right 1105 indicates type of access rights instructed to be transferred, for example, from the owner 1103 to the user 1104. A pass phrase 1106 stores a pass phrase set upon the provision of a transfer instruction by a user of a tenant indicated by the instructor 1102. The stored pass phrase is a pass phrase to be input when a user of a tenant indicated by the user 1104 accepts a transfer of rights.

Each of an owner-to-instructor trust/delegation relationship 1107, an owner-to-user trust/delegation relationship 1108, and a user-to-instructor trust relationship 1109 indicates a check result with respect to each trust/delegation relationship obtained by transfer determination to be described below. The value "OK" indicates that the respective conditions satisfy a transfer condition, whereas the value "NG" indicates that an acceptance operation by a tenant user is required because the transfer condition is not satisfied. An entrustment intermediary tenant 1110 indicates that an entrustment instruction has been provided via the entrustment intermediary tenant 1110 without direct provision of a service entrustment instruction from an instructor tenant to a user tenant. As described above, the entrustment/transfer instruction ticket management table 4033 indicates that the instructor 1102 instructs the owner 1103 to transfer access rights to owner tenant data to a tenant indicated by the user 1104. The entrustment/transfer instruction ticket management table 4033 also indicates that the instructor 1102 instructs the user 1104 to access data of a tenant indicated by the owner 1103 so as to provide services such as device management to the owner 1103.

(Tenant-to-Tenant Trust/Delegation Relationship Management Table 4034)

The tenant-to-tenant trust/delegation relationship management table 4034 shown in FIG. 6B indicates a table for storing a trust/delegation relationship between tenants. A tenant indicated by a subject 1201 trusts a tenant indicated by a target 1203 or delegates a transfer of access rights to a tenant indicated by a target 1203. Either trust or delegation is indicated in a trust/delegation 1202.

The access permission management unit 403 refers to a trust/delegation relationship upon determining whether or not a transfer of access rights instructed from an instructor is executed. More specifically, when an owner tenant trusts an instructor tenant or a user tenant, the access permission management unit 403 determines that the owner tenant may accept a transfer instruction so as to execute a transfer of rights. When a user tenant trusts an instructor tenant, the access permission management unit 403 determines that the user tenant may accept a transfer instruction given by the instructor and services may be provided after accepting a transfer of access rights. When an owner tenant delegates access rights to an instructor tenant, the access permission management unit 403 determines that a transfer of access rights may be made even when the owner tenant does not trust the user tenant.

In the present embodiment, when a tenant 2 immediately above a tenant 1 and the tenant belong to the same group in the tenant hierarchy management table 4023 (FIG. 4C) and the tenant group management table 4024 (FIG. 4D), it is defined that the tenant 1 is in "direct relationship" with the tenant 2. When the tenant 1 is in a trust relationship or a delegation relationship with the tenant 2 in the tenant-to-tenant trust/delegation relationship management table 4034 shown in FIG. 6B, it is also defined that the tenant 1 is in "direct relationship" with the tenant 2. Furthermore, when the tenant 2 which is in a direct relationship with the tenant 1 is in a direct relationship with a tenant 3, it is defined that the tenant 1 is in an "indirect relationship" with the tenant 3, but not vice versa because the upper and lower levels of a hierarchical structure of tenants and a trust/delegation relationship have directionality. For example, it is to be pointed out that the tenant 3 is not in an "indirect relationship" with the tenant 1. For determining the presence or absence of a trust relationship upon determination of execution of a transfer of rights, it is determined that there is a trust relationship even in the case of "indirect relationship" based on the aforementioned definition.

FIGS. 7A and 7B are diagrams illustrating the configurations of the respective tables managed by the device management service unit 404.
(Tenant-Specific Data Table)

In the present embodiment, plural types of data for a plurality of tenants can be stored by setting a table name to <tenant ID>. The tenant-specific data table 4041 shown in FIG. 7A is a table that manages device information managed for each tenant. The tenant-specific data table 4041 is a table that has a table name of ABC_JP.device_info and manages device information owned by ABC_JP tenant.

A device ID 1301 is an ID for identifying a device. A serial No. or a MAC address is set as the device ID 1301. An IP address 1302 is an IP address set as an attribute of a device. An installed location 1303 is installed location information set as an attribute of a device. Although the number of data columns is three as shown in FIG. 7A, any number of columns or any data type information may be stored. As another embodiment, there is a method for storing data of all tenants in a single table having a tenant ID column. For example, a tenant ID column may be set on top of a device ID so as to set a tenant ID such as ABC_JP. It may be clarified that which tenant owns data for a device in each row. Alternatively, it may also be clarified that which tenant owns data for a device in each row by adding a tenant ID to a device ID indicated by the device ID 1301.

The SP tenant-specific customer management table 4042 shown in FIG. 7B is a table that manages service status to a customer tenant managed for each service provider tenant. FIG. 7B is a diagram illustrating an exemplary customer management table managed by the service provider SP_US. A customer tenant ID 3601 stores a customer tenant ID, which is managed by the service provider SP_US, for providing services. A service status 3602 stores "providing" when a customer tenant in the row of interest permits access to the service provider SP_US, whereas the service status 3602 stores "not yet started" when a customer tenant in the row of interest does not permit access to the service provider SP_US.
(Processing Flow)

Hereinafter, a description will be given of the processing flows performed by the host computers 101 and 102 and the management server 103.
(User Authorization Processing)

Figure 9:
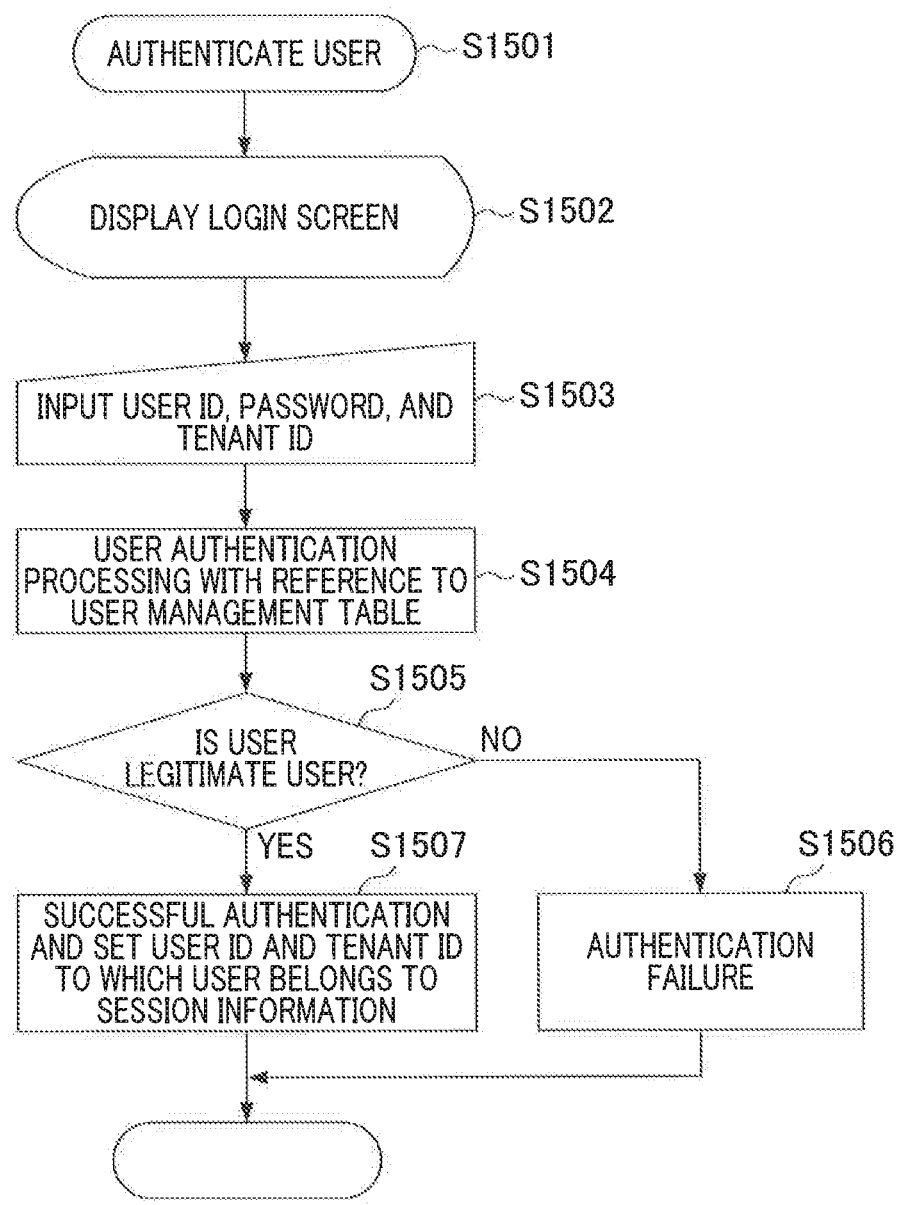
FIG. 9 is a flowchart illustrating the flow of user authentication processing.

FIG. 9 is a flowchart illustrating the flow of user authentication processing for a user who uses the management system of the present embodiment. A customer tenant user and an SP tenant user perform authentication processing as in FIG. 9. Firstly, a user of the host computer 101 or 102 uses the Web browser 301 so as to specify the URL of the management server 103. Then, the Web browser 301 transmits a screen display request to the management server 103 specified by the URL via the network 104. When the interface unit 401 receives the request, the management server 103 checks session information via cookie information or the like so as to determine whether or not the request has already been authenticated. When the request is not yet authenticated, the user authentication processing shown in FIG. 9 is performed.

In step S1501, the management server 103 starts user authentication processing. In step S1502, the interface unit 401 creates HTML data indicating a login screen and transmits the HTML data to a host computer via a network. In the host computer, the HTTP communication unit 302 receives the HTML data and analyzes the HTML data using the Web browser 301 so as to display a login screen. In step S1503, a user inputs his user ID, password, and tenant ID to the login screen. The input information is transmitted to the management server 103 via the HTTP communication unit 302.

In step S1504, the interface unit 401 provided in the management server 103 transmits the received user ID, password, and tenant ID to the tenant/user management unit 402. The tenant/user management unit 402 which has received the user ID, password, and tenant ID refers to the user management table 4022. The tenant/user management unit 402 checks whether or not there is a user matching all of the user ID, password, and tenant ID. When there is a matched user, the tenant/user management unit 402 determines that the user is a legitimate user.

In step S1505, the process proceeds to step S1507 if the tenant/user management unit 402 determines in step S1504 that the user is a legitimate user. Otherwise, the process proceeds to step S1506 and the tenant/user management unit 402 determines that the authentication has been failed and notifies the interface unit 401 of the authentication failure. In step S1506, the tenant/user management unit 402 notifies the interface unit 401 of the authentication failure. The interface unit 401 creates HTML data for reporting an interface login failure and transmits the HTML data to the host computer. Then, the user authentication processing ends.

In step S1507, the tenant/user management unit 402 notifies the interface unit 401 of a successful authentication. The interface unit 401 sets the user ID, the tenant ID to which the user belongs, and the type of the tenant to session information. At this time, role information associated with an authenticated user may also be set in the HTTP header. The interface unit 401 further creates HTML data representing Web page requested from a host computer based on session information and transmits the HTML data to the host computer. Unless otherwise specified in the Web page, the interface unit 401 creates HTML data of the home page corresponding to the tenant type and transmits the HTML data to the host computer.

When a user of a service provider tenant logs in, an SP home page 1600 shown in FIG. 10A is displayed. Reference numeral 1601 is a link to a customer tenant registration screen. When a link is selected by a mouse pointer or the like, the screen of the SP home page 1600 is transitioned to the customer tenant registration screen shown in FIG. 11A. Reference numeral 1602 is a link to a device management service customer management screen. When a link is selected by a mouse pointer or the like, the screen is transitioned to the device management service customer management screen shown in FIG. 12A. Reference numeral 1603 is a link to a device management service entrustment management screen. When a link is selected by a mouse pointer or the like, the screen is transitioned to the service entrustment management screen shown in FIG. 13A. Reference numeral 1604 is a region on which a login user name who displays a home page screen is displayed. Reference numeral 1605 is a link to a home page screen. When a link is selected by a mouse pointer or the like, the screen is transitioned to the home page screen shown in FIG. 10A. Reference numerals 1604 and 1605 are controls that are commonly displayed on other screens, and thus, an explanation thereof will be omitted herein below.

Figure 10B:
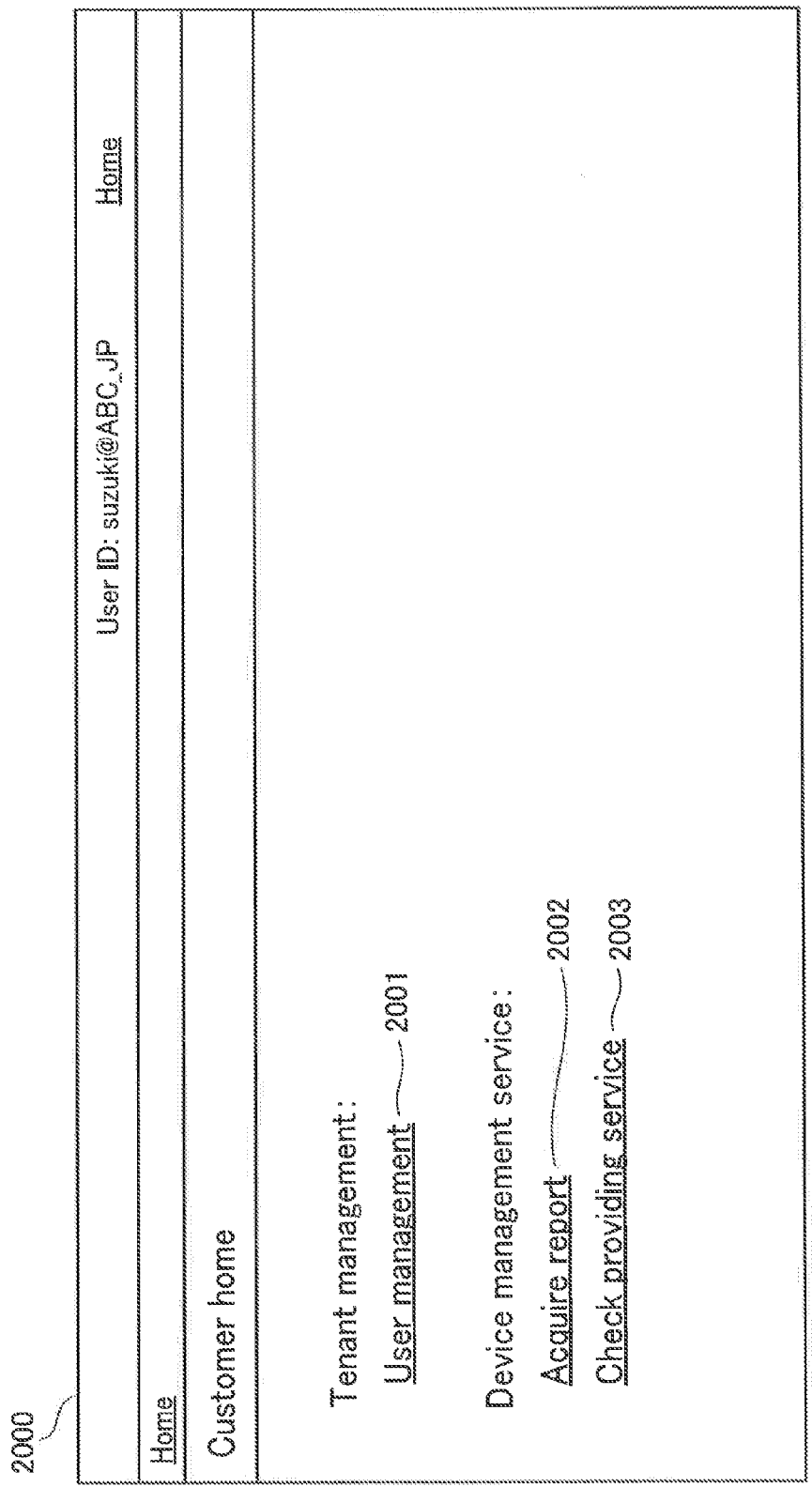

When a customer tenant user logs in, a customer home page screen 2000 shown in FIG. 10B is displayed. Reference numeral 2001 is a link to a customer tenant user management screen. When a link is selected by a mouse pointer or the like, the screen is transitioned to the user management screen. Although not illustrated, the user management screen is a screen that can add, change, and delete a tenant user. On the user management screen, a user can be added and changed by specifying his user ID and password. User information is stored in the user management table shown in FIG. 4B. Reference numeral 2002 is a link to a report acquisition screen.

When a link is selected by a mouse pointer or the like, the screen is transitioned to the report acquisition screen. The report acquisition screen is a screen on which a report created by a service provider for providing services to customers can be downloaded. Reference numeral 2003 is a link to a providing service check screen. The fact that which service provider is providing what type of services to a customer who displays the providing service check screen is displayed on the providing service check screen. On the providing service check screen, the owner tenant 901 acquires a row matching the tenant ID of the customer who displays the providing service check screen from the access rights management table shown in FIG. 5A, and the user tenant 902 and the permitted right 903 are displayed.

In the first embodiment, a description will be given of the flow of processing for realizing access permitting and service entrustment by taking an example of the first use case. Assume that SP_US of the service provider tenant (hereinafter referred to as "SP tenant") which is the first service providing device has made a device management service contract with the customer ABC_Corp group. SP_US needs to create an integrated report for the entire ABC_Corp group so as to provide it to ABC_Corp. ABC_JP exists at subordinates of ABC_Corp but SP_US cannot directly provide services to ABC_JP. Thus, SP_US wants to entrust device management and report creation (unitary report creation for ABC_JP) services to the service provider SP_JP which is the second service providing device.

Figure 17A:
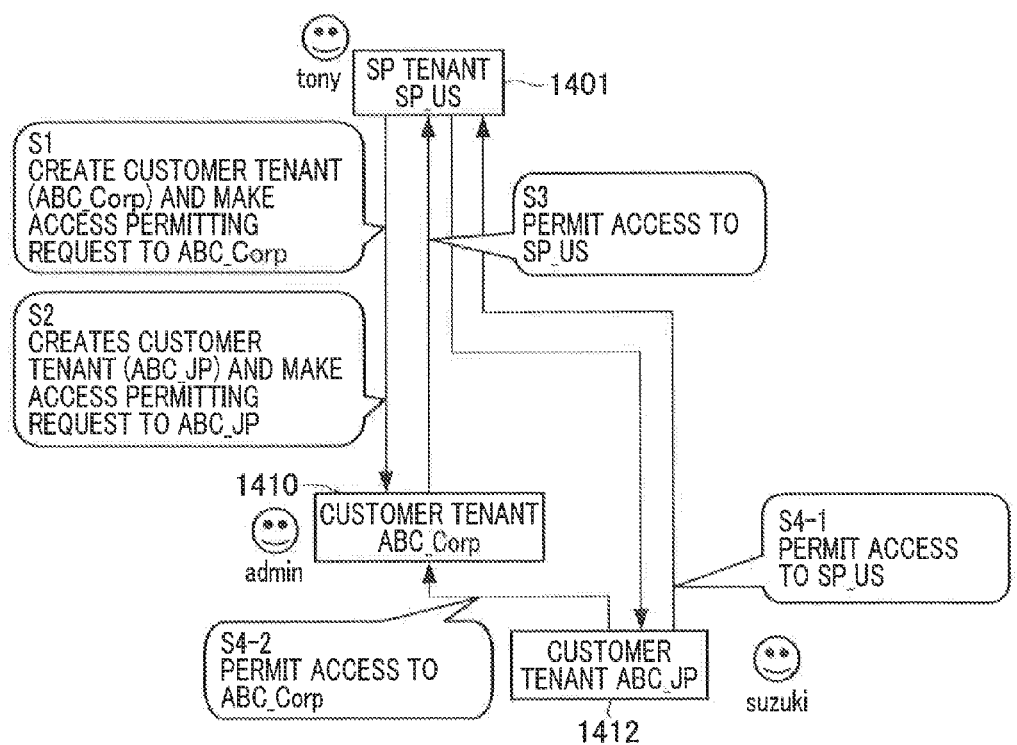
FIGS. 17A and 17B are flow diagrams illustrating access permitting processing and entrustment/transfer acceptance processing.

FIG. 17A is a diagram illustrating the flow of processing performed until the user "tony" of the SP tenant SP_US obtains an access permission by creating the customer tenants ABC_Corp and ABC_JP using the management server 103. A rectangular represents a tenant and an arrow represents an operation, the starting point of an arrow represents a tenant who performs an operation, the end point of an arrow represents a tenant to be operated, and a text bubble and a numbered content represent the order of operations and an operation content. Reference numeral 1401 refers to the SP tenant SP_US, reference numeral 1410 refers to the customer tenant ABC_Corp, and reference numeral 1412 refers to the customer tenant ABC_JP.

Firstly, in step S1, the user "tony" of SP_US creates the customer tenant ABC_Corp, and registers ABC_Corp on the management server 103 and simultaneously makes an access permitting request. Next, in step S2, the user "tony" of SP_US creates the customer tenant ABC_JP, and registers ABC_JP on the management server 103 and simultaneously makes an access permitting request. In step S3, the user admin of ABC_Corp permits access permitting request from SP_US via the management server 103. In step S4-1, the user "suzuki" of ABC_JP permits access permitting request from SP_US. In S4-2, the user "suzuki" of ABC_JP performs access permission processing to ABC_Corp.

A description will be given of specific processing from creating a customer tenant (ABC_JP) by the user "tony" of SP_US to making an access permitting request to the management server 103 in step S2.

(Customer Tenant Registration Processing)

When the user "tony" of SP_US accesses the management server 103 from a host computer 1 and performs a login operation, the home page screen 1600 shown in FIG. 10A is displayed. When the user "tony" selects a link to the customer tenant registration 1601 to register a customer tenant, the home page screen 1600 is transitioned to a customer tenant registration screen (reference numeral 1710 in FIG. 11A).

FIGS. 11A and 11B are diagrams illustrating examples of customer tenant registration screens. In order to create a customer tenant (ABC_JP), the user "tony" specifies the user ID 1711 of the administrator of the customer tenant, the password 1712 of the customer administrator of the customer tenant, and the ID 1713 of the customer tenant at the higher level in the customer tenant hierarchy. When these pieces of information are input and a [register] button 1714 is pressed, tenant creation request information is set to the HTTP request, and the HTTP request is transmitted to the management server 103. The interface unit 401 receives the HTTP request and checks input information. If there is no problem, the management server 103 transmits a tenant creation request to the tenant/user management unit 402. The tenant/user management unit 402 issues a unique tenant ID and registers a record based on the information input to the tenant management table 4021, the user management table 4022, and the tenant hierarchy management table 4023.

Upon completion of registration processing, the issued tenant ID and other information are transmitted to the interface unit 401. The interface unit 401 creates HTML data of the customer tenant registration result screen 1720 (FIG. 11B) and transmits the HTML data to the Web browser 301 of the host computer 1 for display. The registered tenant ID 1721, the administrator's user ID 1722, and the upper customer tenant ID 1723 are displayed on the customer tenant registration result screen 1720. In the example, "ABC_JP" is shown as an example of tenant ID for ease of understanding, but the description format is not particularly limited.

As a result of ABC_Corp customer tenant registration in step S1, a row 518 in the tenant management table shown in FIG. 4A and a row 613 in the user management table shown in FIG. 4B are registered. As a result of ABC_JP customer tenant registration in step S2, a row 520 in the tenant management table shown in FIG. 4A and a row 614 in the user management table shown in FIG. 4B are registered. In the examples shown in FIGS. 11A and 11B, ABC_JP is created as a lower tenant of ABC_Corp, and suzuki is specified as the user ID of the administrator of the created tenant.

Figure 12B:
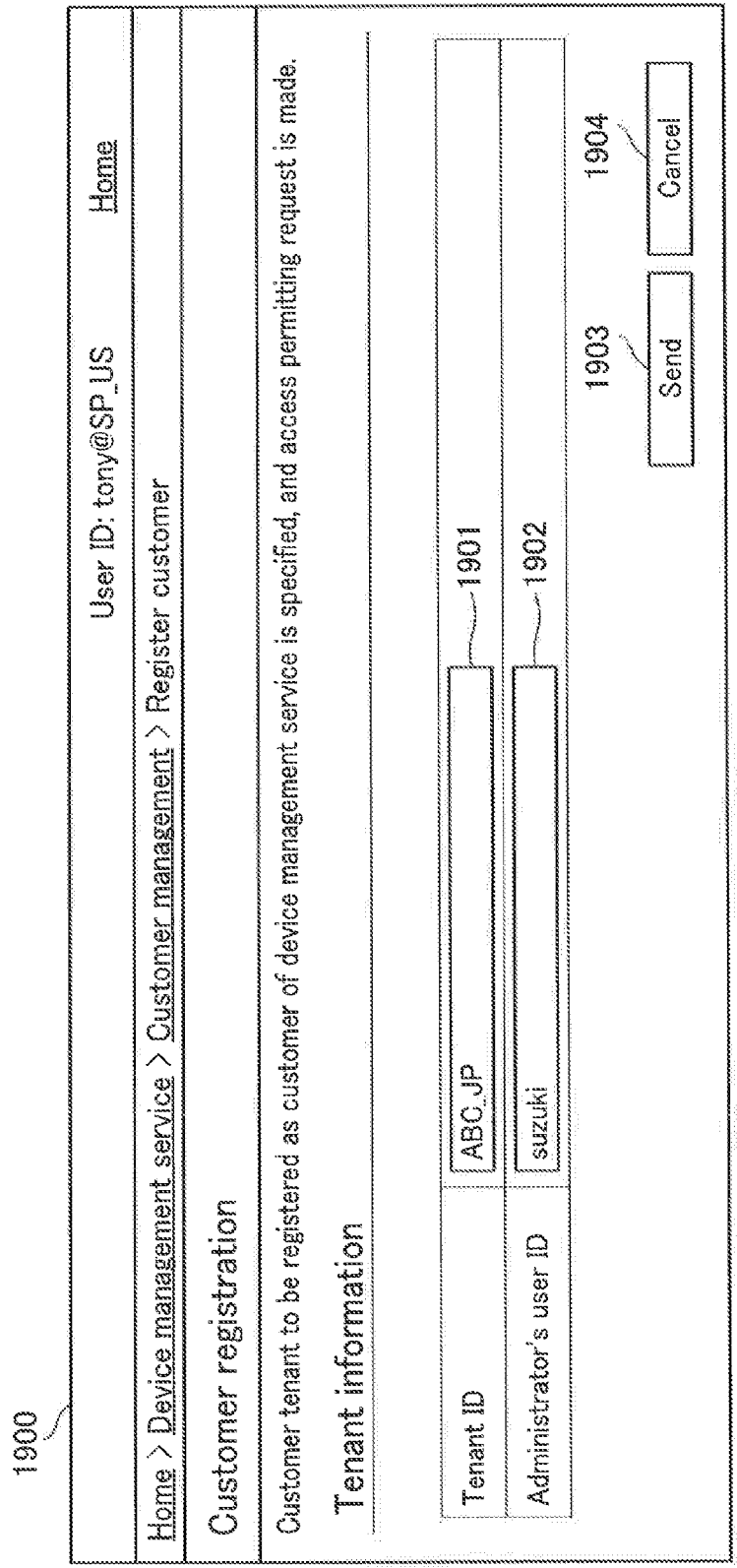

Next, a description will be given of a customer registration request and an access permitting request to be submitted to the management server 103. The user "tony" of the service provider SP_US returns to the home page 1600 shown in FIG. 10A so as to select a link to the customer management 1602. Then, the screen is transitioned to a customer management screen 1800 shown in FIG. 12A. A registration button 1801 on the customer management screen 1800 is a button for performing a customer registration operation for registering customers on the management server 103. Upon pressing the registration button 1801, the screen is transitioned to a customer registration screen 1900 (FIG. 12B). A un-register button 1802 is a button for deregistering a customer tenant selected by a radio button 1803 on the customer list. Other items will be described below.

The SP user specifies a customer targeted for a device management service on the customer registration screen 1900 so as to issue an access permitting request. The ID of a customer tenant to be registered is specified on a tenant ID 1901 and the user ID of the administrator of the customer tenant to be registered is specified on an administrator's user ID 1902. It is contemplated that a customer tenant ID alone may lead to register a wrong customer tenant due to an erroneous input. Thus, the input of the administrator's user ID 1902 means to prevent an input error from happening. In the examples shown in FIG. 12B, an attempt is made to register a request for permitting access to the customer tenant ABC_JP.

When the SP user presses a send button 1903, an access permitting request including an SP tenant ID, a customer tenant ID, and an administrator's user ID is transmitted as an HTTP request to the management server 103. Upon receiving the access permitting request, the management server 103 transmits the access permitting request to the device management service unit 404. Upon receiving a customer registration request, the device management service unit 404 transmits the customer tenant ID and the administrator's user ID to the tenant/user management unit 402 so as to check whether or not there is a tenant matching two pieces of information. Here, the tenant/user management unit 402 confirms that a tenant matching a record 614 has already been registered on the user management table 4022. The device management service unit 404 transmits an access permitting request registration request including the SP tenant ID (SP_US), the customer tenant ID (ABC_JP), and a predetermined permitted right to the access permission management unit 403.

The access permission management unit 403 adds a record 1012 to the access permission request management table 4032 (FIG. 5B). More specifically, the access permission management unit 403 sets ABC_JP to the owner tenant 1001 and SP_US to the permitting request/user tenant 1002 on the access permission request management table 4032. Also, the access permission management unit 403 sets a device management right, a count/report creation right, and an integrated report creation right to the access permitting request 1003. Next, the device management service unit 404 adds a record 3614 to the SP tenant-specific customer management table 4042 (FIG. 7B). More specifically, the access permission management unit 403 sets ABC_JP to the customer tenant ID 3601 and "not yet started" to the service status 3602.

(Customer Management Screen 1800 (FIG. 12A))

A description will be given of customer tenant information on the customer management screen 1800 (FIG. 12A). A list of customer tenants to whom a tenant (SP_US) to which the login user belongs is providing services or making an access permitting request is displayed on the customer management screen 1800. The customer management screen 1800 is created with reference to the SP tenant-specific customer management table 4042 of a tenant (SP_US) to which the login user belongs.

A customer tenant ID 1804 (the customer tenant ID 3601 on the SP tenant-specific customer management table 4042) and a service status 1806 (the service status 3602 on the SP tenant-specific customer management table 4042) are displayed on the customer list. The sum total number of the registered devices, which is acquired from the list of devices managed on the tenant-specific data table 4041 (not shown), is displayed on a number of devices 1807.

An operation selection button 1810 is a button provided for each customer tenant on the customer list. When the SP user presses the button, a customer operation menu 1811 for specifying an operation for the customer tenant in the column in question is displayed. A menu is displayed on the customer operation menu 1811 depending on rights permitted from the customer tenant for which the operation selection button 1810 has been pressed to the service provider tenant to which the login user belongs. The permitted rights are acquired from the permitted right 903 on the access rights management table (FIG. 5A), and menus relating to the permitted rights are displayed.

In the examples shown in FIG. 12A, the user "tony" of SP_US logs in and a screen is displayed on the host computer 1, and the customer operation menu 1811 for the customer tenant ABC_US is displayed on the screen. Menus associated with a device management right, a count/report creation right, and an integrated report creation right, which have been permitted from the customer ABC_US, are displayed on the customer operation menu 1811. A device management 1812, a report creation 1813, and a service entrustment request 1814 are displayed as customer operation menus. When the device management 1812 and the report creation 1813 are selected, the screen is transitioned to a screen for using service functions provided from the device management service unit 404 to the selected customer tenant, but the explanation thereof will be omitted.

Figure 21:
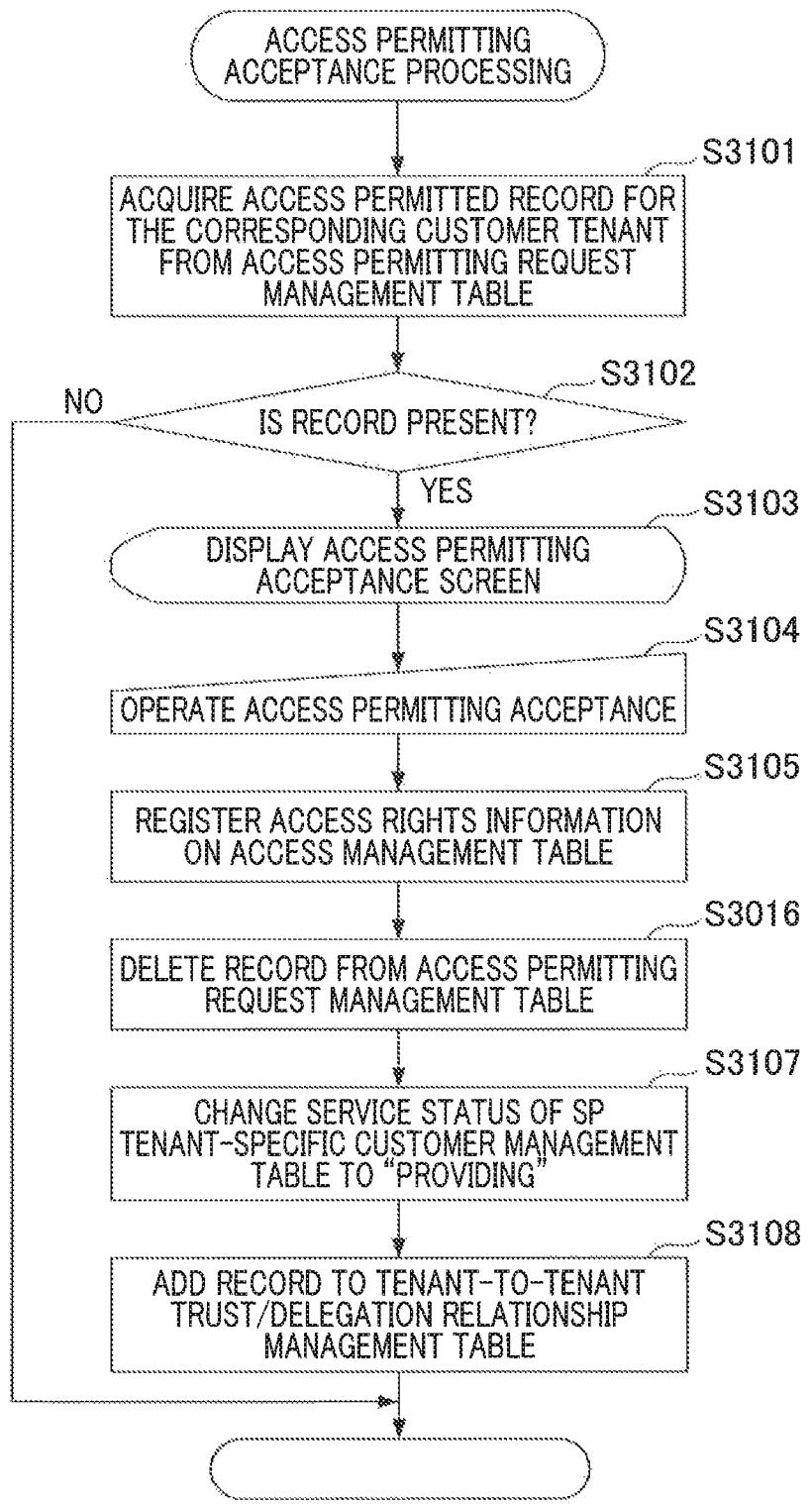
FIG. 21 is a flowchart illustrating the flow of access permitting acceptance processing.

Next, a description will be given of access permitting processing performed by the management server 103 with respect to access rights permitted by a customer tenant user with reference to FIG. 21. In the flowchart, a description will be given by taking an example of processing performed when the user "suzuki" of the customer tenant ABC_JP accepts permitting of access rights. When the customer tenant user accesses the management server 103 from a host computer 2 and logs in to the management server 103, the customer home page screen 2000 (FIG. 10B) is displayed.

When the customer tenant user selects the menu of the service confirmation 2003, a screen transition request including the selected menu information and the customer tenant ID to which the user belongs is transmitted to the management server 103. After the interface unit 401 sets screen transition request information to session information, the management server 103 transmits the screen transition request to the device management service unit 404. The device management service unit 404 calls the access permission management unit 403 so as to execute access permitting acceptance processing shown in FIG. 21.

In step S3101, the access permission management unit 403 acquires the access permitted record 1012 in which the customer tenant ID (ABC_JP) included in the screen transition request matches the owner tenant 1001 from the access permission request management table 4032. Next, when there is no access permitted record in step S3102, the process proceeds to step S3108. When there is an access permitted record 1012, the process proceeds to step S3103. In step S3103, the interface unit 401 creates HTML data for displaying an access permitting acceptance screen 2100 shown in FIG. 13A and transmits the HTML data to the Web browser 301 of the host computer 2 via the interface unit 401.

The Web browser 301 displays the permitting request/user tenant 1002 of the access permitted record (SP_US) on the access permitting tenant 2101 on the access permitting acceptance screen 2100. The access permitting request 1003 for the access permitted record of the record 1012 is displayed on an access permitted service and data 2102.

When there is a plurality of access permitted records, a plurality of combinations may also be displayed as shown in reference numerals 2103 and 2104. Whether or not a transfer of access rights to an entrustee upon entrustment services is delegated to the SP tenant (in the example, SP_US) who has made an access permitting request is specified by a delegation relationship check box 2110. When the check box is brought into a selected state, it indicates that a delegation relationship (accepting a transfer of access rights to an entrustee upon entrustment services) is established with the SP tenant who has made the access permitting request. The pressing of a [permit access] button 2105 indicates an access permitting acceptance, and the access permitting acceptance request is transmitted to the management server 103.

When the user presses the [permit access] button 2105 on the Web browser 301 in step S3104, the process proceeds to step S3105. When the management server 103 receives the access permitting acceptance request in step S3105, the access permitting acceptance request is transmitted to the access permission management unit 403, and the access permission management unit 403 registers the accepted access rights information on the access rights management table 4031. In other words, the access permission management unit 403 registers a record 912 on the access rights management table 4031. Next, in step S3106, the access permission management unit 403 deletes a record (the record 1012 in FIG. 5B) relating to the corresponding customer tenant from the access permission request management table 4032. In step S3107, the access permission management unit 403 changes the service status 3602 of the SP tenant-specific customer management table 4042 for the corresponding SP tenant of the permitting request/user tenant 1002 to "providing". Here, the service status 3602 of the record 3614 is changed to "providing".

In step S3108, the access permission management unit 403 adds a record 1212 to the tenant-to-tenant trust/delegation relationship management table 4034. The access permission management unit 403 sets the customer tenant ID (ABC_JP) to which the operating user belongs to the subject 1201 shown in FIG. 6B. The access permission management unit 403 also sets the SP tenant ID (SP_US) specified by the permitting request/user tenant 1002 to the target 1203. When the delegation relationship check box 2110 has been selected, the value "delegation" is set to the trust/delegation 1202, whereas when the delegation relationship check box 2110 has not been selected, the value "trust" is set to the trust/delegation 1202. The added record indicates that the tenant in the subject 1201 trusts the tenant in the target 1203 or delegates rights indicated by the trust/delegation 1202 to the tenant in the target 1203.

Upon completion of these processing operations, the device management service unit 404 transmits an access permitting processing result screen via the interface unit 401. The aforementioned detailed description has been given of the flow of processing performed until the SP tenant SP_US shown in FIG. 17A obtains an access permission by registering the customer tenants ABC_Corp and ABC_JP on the management server 103.

Figure 17B:
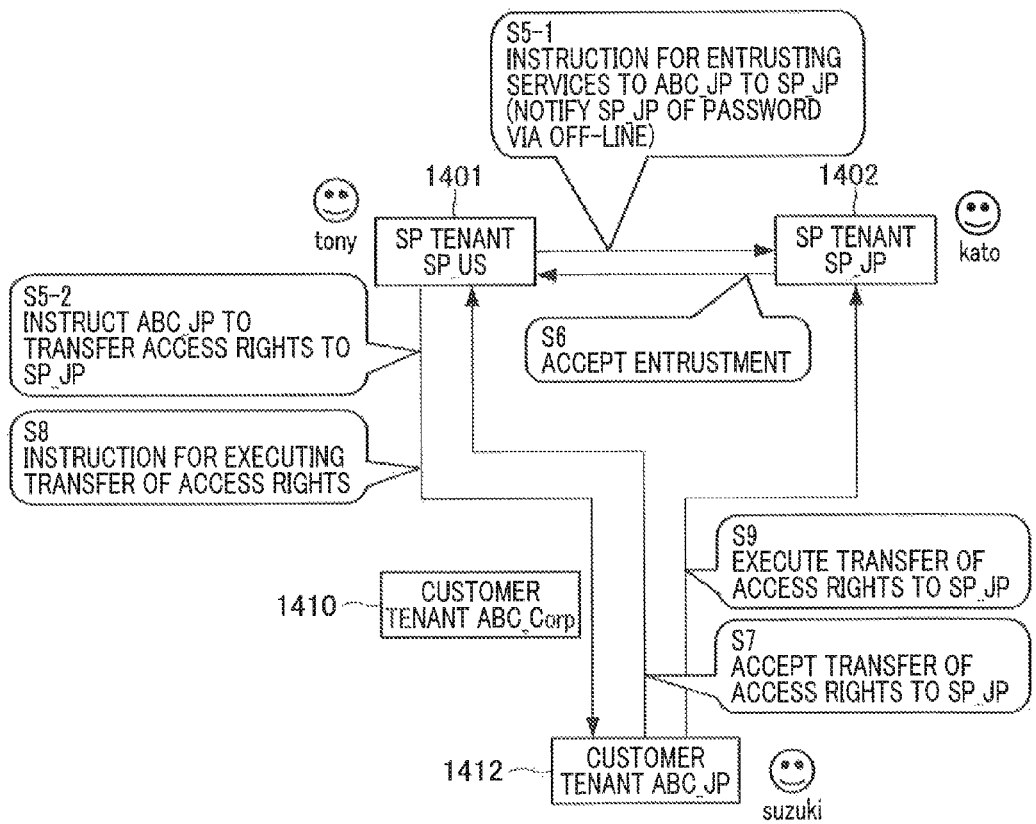

FIG. 17B is a diagram illustrating the flow of processing performed until ABC_JP accepts a transfer of access rights to SP_JP after the SP tenant SP_US instructs the SP tenant SP_JP to entrust services for the customer tenant ABC_JP. The flow is executed by providing an entrustment and transfer instruction given by SP_US who is the third party. In FIG. 17B, the SP tenant SP_JP 1402 is further added in addition to the tenants shown in FIG. 17A.

Firstly, in step S5-1, the user "tony" of SP_US performs an entrustment operation for entrusting services to the customer tenant ABC_JP to the SP tenant SP_JP. On the other hand, in step S5-2, the user "tony" instructs ABC_JP to transfer access rights to SP_JP. Next, in step S6, the user "kato" of the SP tenant SP_JP performs an entrustment acceptance operation. Next, in step S7, the user "suzuki" of the customer tenant ABC_JP performs an acceptance operation for accepting access rights to SP_JP. When a transfer condition for transferring access rights is satisfied as a result of these operations, an access rights transfer execution instruction is provided in step S8, and processing for transferring access rights from ABC_JP to SP_JP is executed in step S9.

Hereinafter, the flow will be described in detail. A description will be given of the entrustment operation performed by the user "tony" of SP_US in step S5-1 with reference to the flowchart in FIG. 22, FIG. 10A, FIG. 14A, and FIG. 15. When the user "tony" of SP_US accesses the management server 103 from the host computer 1 using a Web browser and logs in to the management server 103, the service provider home page 1600 (FIG. 10A) is displayed. When a link 1603 to an entrustment management screen is selected for an entrustment operation, a service entrustment management screen 2200 (FIG. 14A) is displayed.

Figure 15:
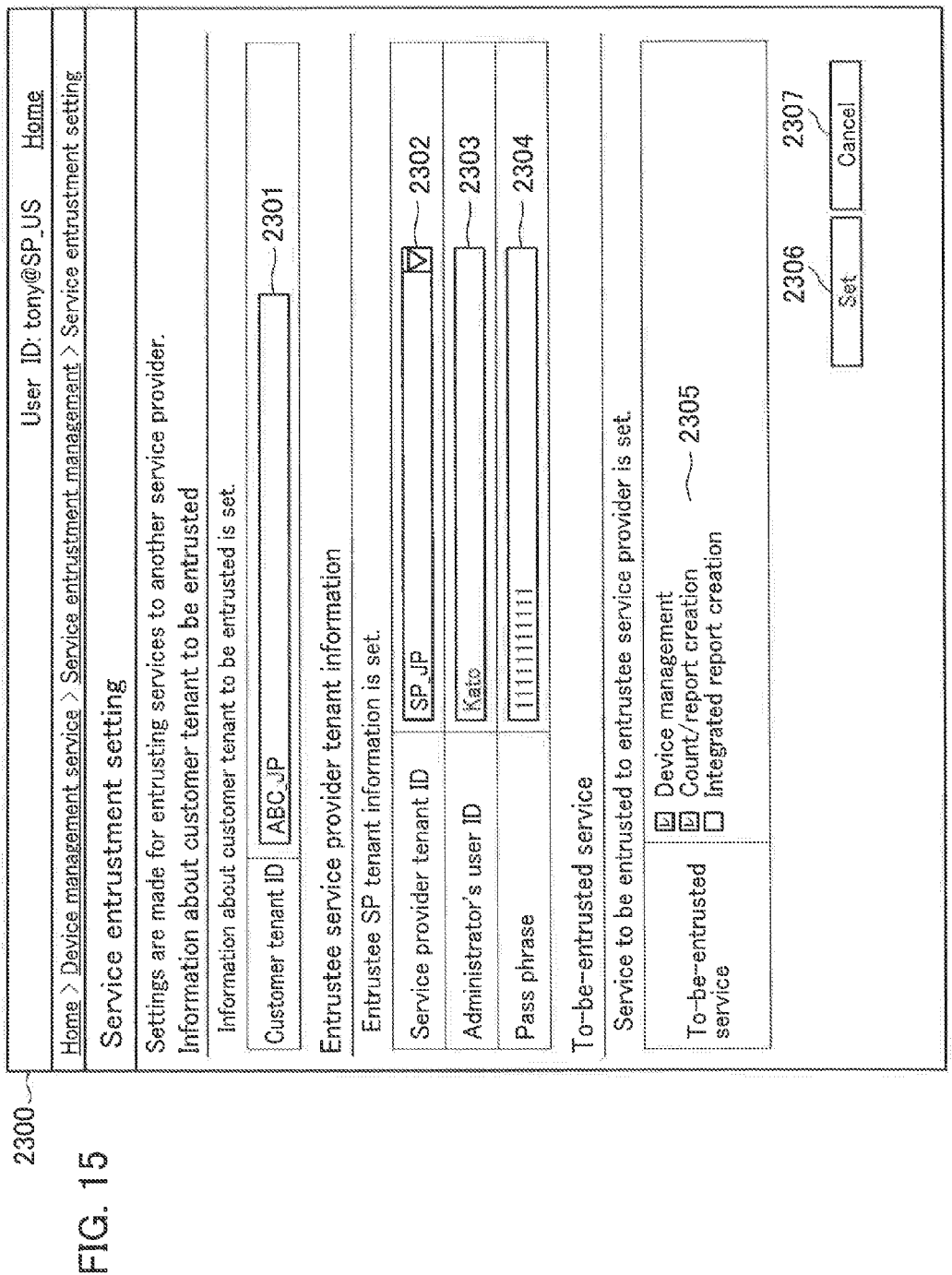
FIG. 15 illustrates an example of a service entrustment setting screen that is used by a service provider.

The item "customer list to be entrusted" or "entrusted customer list" can be selected on a customer list selection control 2201 on the service entrustment management screen 2200. The screen is switched upon pressing an "apply" button 2202. When the item "customer list to be entrusted" is selected, the following information can be displayed and the following operation can be performed. When the user "tony" of SP_US presses an "add service entrustment" button 2217, the screen is transitioned to a service entrustment setting screen 2300 (FIG. 15). When the item "entrusted customer list" is selected, the screen is switched to a display content shown in FIG. 14B. A new service entrustment intermediary request can be added by an "add service entrustment intermediary" button 2218. The details will be described below.

The customer list shown in FIG. 14A is created with reference to the entrustment/transfer instruction ticket management table 4033. The instructor 1102 acquires a record matching a tenant ID to which the login user belongs, and displays one record in one row in a customer list. Reference numeral 2211 denotes a customer tenant ID to be entrusted, reference numeral 2212 denotes the entrustee's SP tenant ID, reference numeral 2213 denotes an entrustment intermediary's SP tenant ID, reference numeral 2214 denotes whether or not a transfer of access rights has already been performed by accepting service entrustment in each row. Examples of the state denoted by reference numeral 2214 include "waiting for SP acceptance", "waiting for customer acceptance", "waiting for SP and customer acceptance", and "accepted". When an "owner-to-instructor trust/delegation relationship" 1107 on the entrustment/transfer instruction ticket management table 4033 is NG or when an "owner-to-user trust/delegation relationship" 1108 is NG, the state becomes "waiting for customer acceptance".

When a "user-to-instructor trust relationship" 1109 is NG, the state becomes "waiting for SP acceptance". When both "waiting for customer acceptance" and "waiting for SP acceptance" satisfy the display condition, the state becomes "waiting for SP and customer acceptance". When three trust relationships are OK, the state becomes "accepted". Reference numeral 2215 denotes the type of a service which is intended to be entrusted. A button 2219 is a button for removing the accepted service entrustment. When the button 2219 is pressed, the transferred rights are deleted from the access rights management table together with the relevant right transfer ticket.

Figure 22:
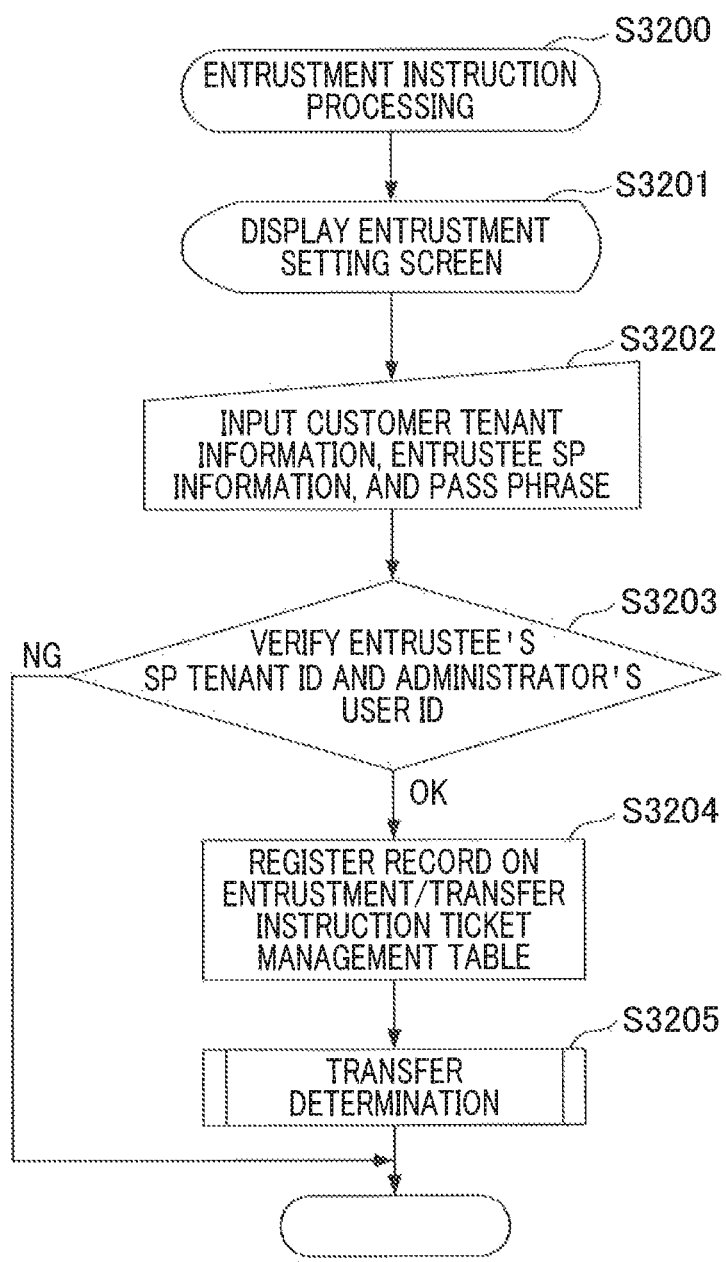
FIG. 22 is a flowchart illustrating the flow of entrustment instruction processing.

When the user "tony" of SP_US presses the "add service entrustment" button 2217 for performing a service entrustment operation in step S5-1, the management server 103 executes the entrustment instruction processing shown in the flowchart in FIG. 22. Firstly, in step S3201, the access permission management unit 403 creates HTML data of the service entrustment setting screen 2300 (FIG. 15), and transmits the HTML data to the Web browser 301.

As shown in FIG. 15, the service entrustment setting screen 2300 has items such as a customer tenant ID 2301, a service provider ID 3202, an administrator's user ID 2303, a pass phrase 2304, a to-be-entrusted service 2305, and the like. The service entrustment setting screen 2300 also has items such as a setting button 2306 and a cancel button 2307.

An entrustee SP provider ID 2302 may be directly input by inputting a tenant ID via a keyboard, but may also be selected from a drop-down list. The SP tenant ID displayed on the drop-down list is a tenant that is in an additional trust relationship with tenants that are at a level lower than that of a tenant to which the login user belongs in the tenant hierarchy and belong to the same group.

The tenant hierarchy is obtained with reference to the tenant hierarchy management table 4023. Whether or not the tenants belong to the same group can be determined with reference to the tenant group management table 4024. Whether or not the additional trust relationship has been established between tenants is obtained with reference to the tenant-to-tenant trust/delegation relationship management table 4034.

The pass phrase 2304 is input to ensure that the entrustee's SP tenant must be a legitimate user. The pass phrase is reported to the user of the entrustee's SP tenant outside the system and is input upon an entrustment acceptance operation, the fault input of an entrustee tenant can be avoided. Then, the to-be-entrusted service 2305 is selected. The entrustment service is a service to be provided from the entrustee SP to a customer to be entrusted. Furthermore, it indicates that a transfer of access rights to necessary data is required so as to provide the service.

In step S3202, the user "tony" of SP_US assigns "ABC_JP" to the customer tenant ID 2301 targeted for service entrustment on the service entrustment setting screen 2300. Also, the user "tony" inputs "SP_JP" to the entrustee's SP tenant ID 2302, inputs "kato" to the administrator's user ID 2303, and inputs "1111111111" to the pass phrase 2304. When the user "tony" of SP_US presses the setting button 2306, the process proceeds to step S3203. In step S3203, the access permission management unit 403 verifies the entrustee's SP tenant ID (SP_JP) and the administrator's user ID (kato) on the tenant management table 4021 so as to check whether or not the administrator's user ID of the entrustee's SP tenant has been correctly specified. When the administrator's user ID of the entrustee's SP tenant is OK, the process proceeds to step S3204 and the processing continues. When the administrator's user ID of the entrustee's SP tenant is NG, the processing is interrupted as an error.

In step S3204, the access permission management unit 403 registers a transfer instruction record on the entrustment/transfer instruction ticket management table 4033. In the input example shown in FIG. 15, a row 1111 shown in FIG. 6A is added to the transfer instruction ticket management table 4033. The tenant ID (SP_US) to which the login user who has provided an entrustment instruction belongs is set to the instructor 1102. The customer tenant ID 2301 (ABC_JP) to be entrusted is set to the owner 1103. The entrustee tenant ID 2302 (SP_JP) is set to the user 1104. The input pass phrase 2304 is set to the pass phrase 1106. The right name representing a service specified by the to-be-entrusted service 2305 is set to the transfer target right 1105. At that time, null is set to each of the columns 1107 to 1109, and the columns 1107 to 1109 are set in the subsequent transfer determination processing shown in FIG. 25.

Figure 19A:
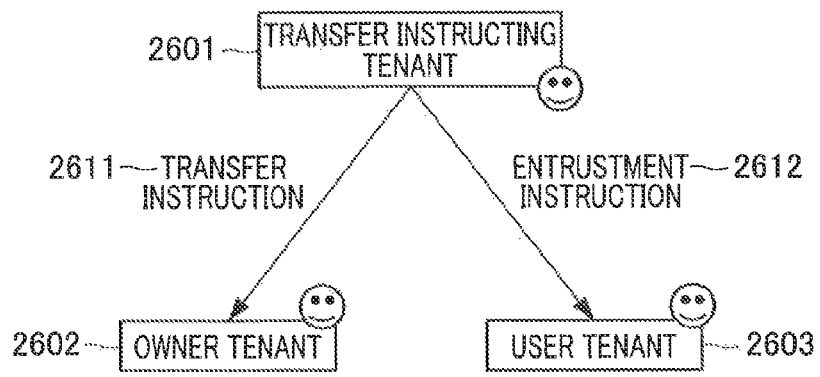
FIGS. 19A to 19C are conceptual diagrams illustrating a transfer/entrustment instruction and a transfer determination condition.

Firstly, a description will be given of the transfer determination condition with reference to a conceptual diagram. FIG. 19A is a conceptual diagram illustrating a service entrustment instruction and a right transfer instruction. Reference numeral 2601 denotes an instructor tenant which indicates a tenant who has provided an instruction for service entrustment to a customer tenant. The instructor tenant 2601 corresponds to the SP tenant SP_US in the first embodiment. Reference numeral 2602 denotes an owner tenant which indicates a customer tenant who is the owner of data. The owner tenant 2602 is a tenant who attempts to transfer access rights to data to the user tenant 2603 upon receiving a transfer instruction from the instructor tenant 2601. The owner tenant 2602 corresponds to the customer tenant ABC_JP in the first embodiment. Reference numeral 2603 denotes a user tenant who attempts to provide services to the owner tenant upon receiving a service entrustment instruction from the instructor tenant 2601. Since the user tenant 2603 needs to access data to provide services, the user tenant 2603 is a tenant who has access rights to data through a transfer of access rights given from the owner tenant 2602. The user tenant 2603 corresponds to the SP tenant SP_JP in the first embodiment.

The instructor tenant 2601 provides an instruction for entrusting services to the owner tenant 2602 to the user tenant 2603 (2612). At the same time, the instructor tenant 2601 instructs the owner tenant 2602 to transfer access rights of data owned by the owner tenant 2602 to the user tenant 2603 (entitle the user tenant 2603 to access data) (2611).

In the present embodiment, a transfer of access rights to data owned by the owner tenant 2602 is instructed by a tenant other than the owner tenant 2602, i.e., a third party. A transfer of access rights is not necessarily performed even if the owner tenant 2602 can trust the user tenant 2603 to which access rights to data are transferred. The owner tenant 2602 cannot execute a transfer of access rights as long as a transfer instruction has been provided from a tenant to be trusted. The user tenant 2603 undertakes (is entrusted) to provide services to the owner tenant 2602 from the instructor tenant 2601. Thus, the user tenant 2603 cannot undertake service provision as long as the user tenant 2603 cannot trust the instructor tenant 2601.

Figure 19B:
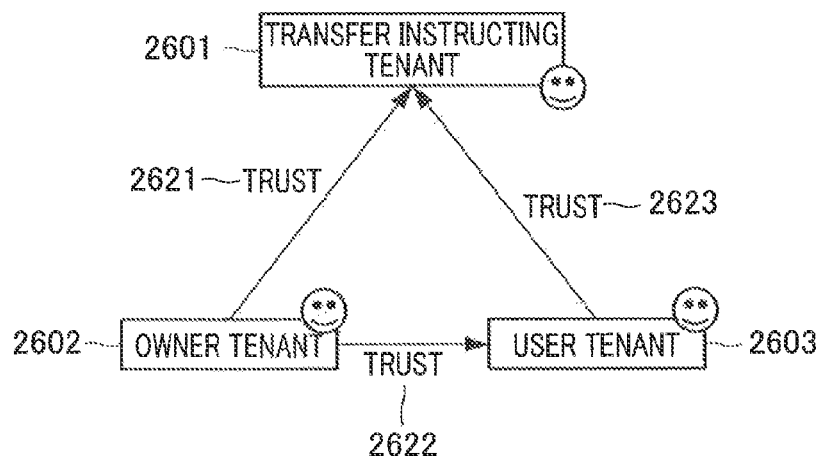

The transfer determination conditions are shown in FIG. 19B. When the illustrated three trust relationships 2621, 2622, and 2623 are established, a right transfer instruction given by the instructor tenant 2601 is executed. In other words, the owner tenant 2602 trusts the instructor tenant 2601 as shown by reference numeral 2621, the owner tenant 2602 trusts the user tenant 2603 as shown by reference numeral 2622, and the user tenant 2603 trusts the instructor tenant 2601 as shown by reference numeral 2623.

Figure 19C:
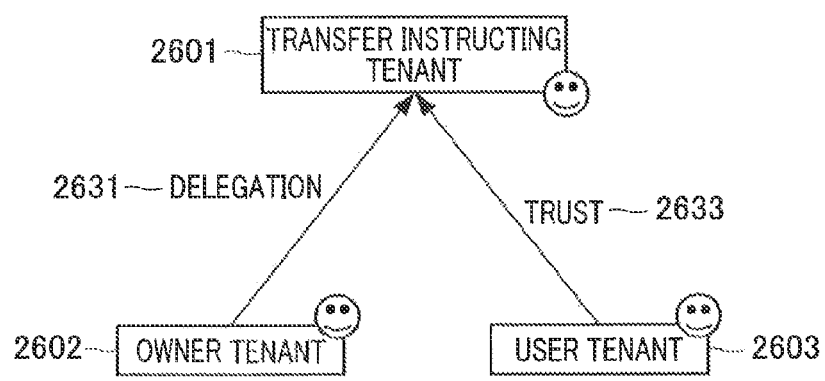

The transfer determination conditions applied when the owner tenant 2602 delegates a transfer of access rights to the instructor tenant 2601 are shown in FIG. 19C. The term "delegation" refers to delegate a transfer of access rights to an instructor tenant in a transfer instruction given from a delegating tenant. Thus, when the owner tenant 2602 delegates a transfer of access rights to the instructor tenant 2601 (2631), a transfer of access rights is accepted even if the owner tenant 2602 is not in a trust relationship with the user tenant 2603. Also, in this case, it goes without saying that the user tenant 2603 needs to trust the instructor tenant 2601 (2633). The case where a service entrustment instruction is intermediated by an intermediary tenant (FIGS. 20A and 20B) will be described below.

A description returns to the operation/processing flow diagram shown in FIG. 17B. When the entrustment operation in step S5-1 is completed, a transfer instruction ticket is registered on the transfer instruction ticket management table 4033. Next, the user "kato" of the SP tenant SP_JP performs an entrustment acceptance operation in step S6. When the user "kato" of the SP tenant SP_JP logs in to the management server 103 using the Web browser 301 of the host computer, the service provider home page 1600 shown in FIG. 10A is displayed. When the user "kato" selects the entrustment management 1603 from the home page 1600, the service entrustment management screen 2200 shown in FIG. 14A is displayed. When the user "kato" selects the "entrusted customer list" using the customer list selection control 2201 and presses the "apply" button 2202, the screen shown in FIG. 14B is displayed.

Customer tenant information about a customer tenant who has provided an entrustment instruction to the SP tenant SP_JP is displayed on the customer list shown in FIG. 14B. The customer list is created by the device management service unit 404 with reference to the transfer instruction ticket management table 4033. The device management service unit 404 acquires the user 1104 matching the tenant ID to which the login user belongs. Then, the device management service unit 404 displays the corresponding record in one row in the customer list. Here, the record 1111 on the transfer instruction ticket management table 4033 is acquired.

The owner tenant 1103 (ABC_JP) is displayed on a customer tenant ID 2221 to be entrusted shown in FIG. 14B. The instructor 1102 (SP_US) is displayed on an entruster's SP tenant ID 2222. The entrustment intermediary tenant 1110 is displayed on an entrustment intermediary's SP tenant ID 2223. Whether or not a transfer of access rights has been authorized by accepting service entrustment in each row is displayed on the service entrustment acceptance status 2224. The content to be displayed is the same as that on the service entrustment acceptance status 2214 shown in FIG. 14A. An entrusted service 2225 indicates information about a service which is intended to be entrusted. A service entrustment acceptance operation button 2229 is a button to be displayed when the service entrustment acceptance status is "waiting for SP acceptance" or "waiting for SP/customer acceptance". When the service entrustment acceptance operation button 2229 is pressed, the entrustment acceptance processing indicated by entrustment acceptance in step S8 is executed.

Figure 23:
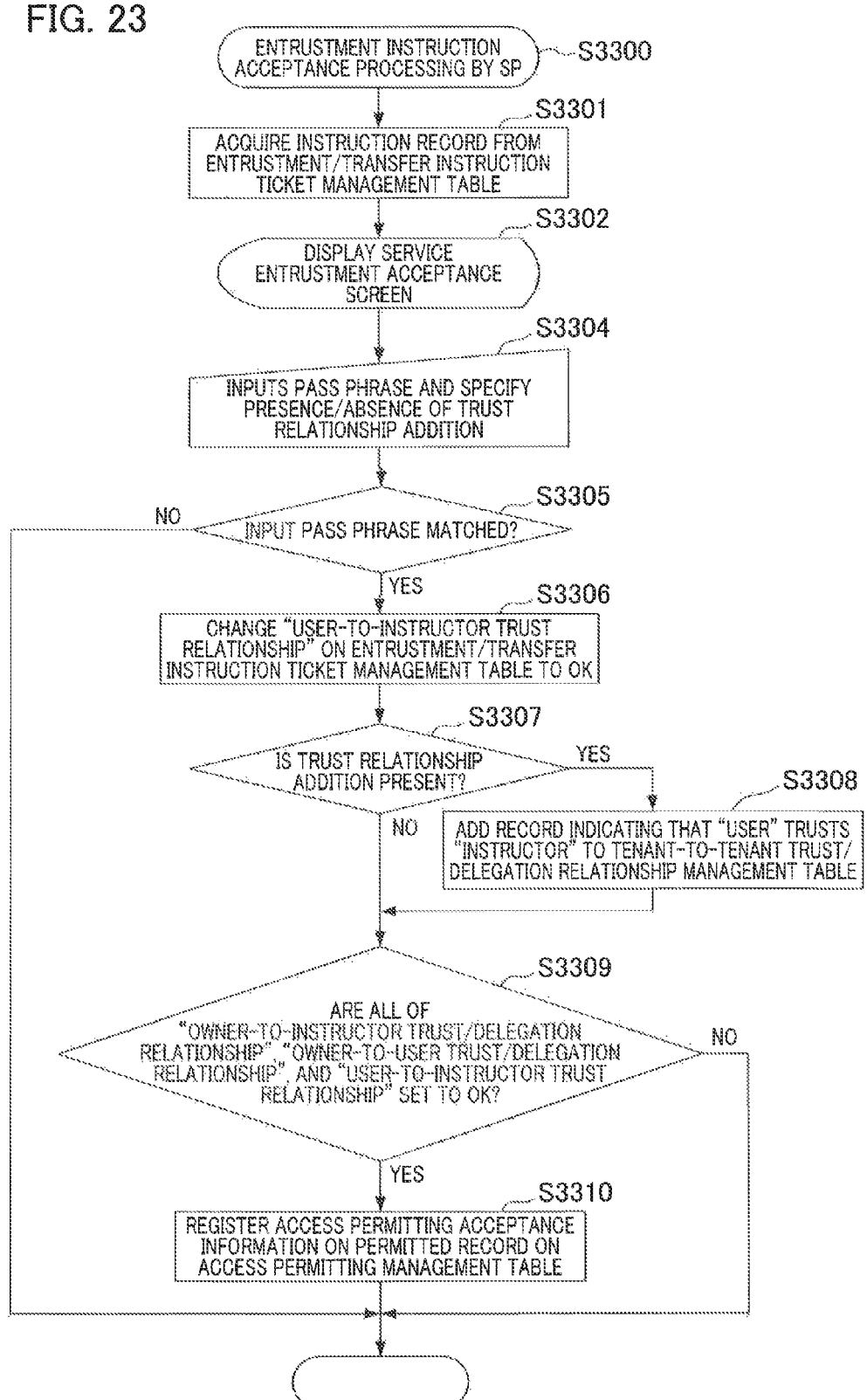
FIG. 23 is a flowchart illustrating the flow of entrustment acceptance processing performed by a service provider.

A description will be given of the flow of entrustment acceptance processing performed when the user "kato" of SP_JP accepts entrustment with reference to FIG. 23. Firstly, in step S3301, the access permission management unit 403 acquires the instruction record 1111 targeted for operation from the transfer instruction ticket management table 4033. Next, in step S3302, the access permission management unit 403 creates HTML data of a service entrustment acceptance screen 2400 (FIG. 16) as an entrustment screen, and transmits the HTML data to the Web browser 301 via the interface unit 401. The content of the instruction record is displayed on the service entrustment acceptance screen 2400 (FIG. 16).

As shown in FIG. 16, the owner 1103 (ABC_JP) is displayed on a customer tenant ID 2401 to be entrusted. The instructor 1102 (SP_US) is displayed on an entruster's SP tenant ID 2402. The target right 1105 (device management, count/report creation) is displayed on a to-be-entrusted service 2404. Whether or not future service entrustment is also accepted by trusting the instructor tenant (SP_US) is specified by a check box 2410. When the check box 2410 is checked, trust relationship information is added to the tenant-to-tenant trust/delegation relationship management table 4034. The user "kato" inputs a pass phrase reported from an external system to a pass phrase 2403 using the Web browser 301 and presses an acceptance button 2411 (step S3304).

When the user "kato" inputs the pass phrase to the pass phrase 2403 and presses the acceptance button 2411, an acceptance request is transmitted from the Web browser 301 to the management server 103, and the request is passed to the access permission management unit 403. Then, the process proceeds to step S3305. In step S3305, the access permission management unit 403 checks whether or not the input pass phrase matches the pass phrase 1106 of the instruction record 1111. When the input pass phrase does not match the pass phrase 1106, the processing ends as an error. When the input pass phrase matches the pass phrase 1106, the process proceeds to step S3306.

In step S3306, the access permission management unit 403 changes the "user-to-instructor trust relationship" 1109 of the record 1111 on the entrustment/transfer instruction ticket management table 4033 to OK. Next, in step S3307, the access permission management unit 403 determines whether or not trust relationship addition has been selected on the check box 2410. When trust relationship addition has been selected on the check box 2410, the process proceeds to step S3308, and a record indicating that "user" trusts "instructor" is added to the tenant-to-tenant trust/delegation relationship management table 4034. Here, a record in which SP_JP has been set as the subject 1201 and SP_US has been set as a target is added.

In step S3309, the access permission management unit 403 determines whether or not all of the "owner-to-instructor trust/delegation relationship" 1107, the "owner-to-user trust/delegation relationship" 1108, and the "user-to-instructor trust relationship" 1109 are set to OK. When all of the three relationships are set to OK, the access permission management unit 403 determines that the entrustment condition is satisfied for access rights. Then, the process proceeds to step S3310 and the entrustment processing is executed. When any one of the three relationships is set to NG, the entrustment condition is not satisfied for access rights, the process ends without execution of the entrustment processing. In the flow, the "user-to-instructor trust relationship" 1109 is set to OK but the "owner-to-instructor trust/delegation relationship" 1107 and the "owner-to-user trust/delegation relationship" 1108 are set to NG, the entrustment processing is not executed. In step S3310, the access permission management unit 403 adds a permitted right record to the access rights management table 4031 based on the entrustment instruction.

Next, a description will be given of processing performed by the management server 103 when the user "suzuki" of the customer tenant ABC_JP accepts a transfer of access rights to SP_JP in step S7. When the user "suzuki" of the customer tenant ABC_JP accesses the management server 103 from the host computer 2 and logs in to the management server 103, the customer home page screen 2000 (FIG. 10B) is displayed.

When the user "suzuki" of ABC_JP selects the service confirmation 2003, a screen transition request including the selected menu information and the customer tenant ID to which the user belongs is transmitted to the management server 103. After the management server 103 sets screen transition request information to session information, the management server 103 transmits the screen transition request to the device management service unit 404. Then, the access permission management unit 403 executes transfer instruction acceptance processing shown in FIG. 24.

Firstly, in step S3401, the access permission management unit 403 acquires the record 1111 of the corresponding customer from the entrustment/transfer instruction ticket table. Next, it is determined in step S3402 whether or not there is an instruction record and either "owner-to-instructor trust/delegation relationship" or "owner-to-user trust/delegation relationship" is set to NG. When NO is determined in step S3402, there is no new transfer instruction, and thus, the processing ends. When YES is determined in step S3402, the process proceeds to step S3403. In the flow, the "user-to-instructor trust relationship" 1109 is set to OK but the "owner-to-instructor trust/delegation relationship" 1107 and the "owner-to-user trust/delegation relationship" 1108 are set to NG, the process proceeds to step S3403. In step S3403, the access permission management unit 403 creates HTML data of an access permitting acceptance screen 3500 (FIG. 13B) as a transfer screen, and transmits the HTML data to the Web browser 301 for display.

The content of the instruction record is displayed on the access permitting acceptance screen 3500. The instructor 1102 is displayed on an access permitting instruction tenant 3501, the user 1104 is displayed on an access permitting tenant 3502, and the target right 1105 is displayed on an access permitting service and data 3503. When the user "suzuki" of ABC_JP presses a "permit access" button 3511 on the Web browser 301, a request for transfer instruction acceptance processing by the customer is transmitted to the management server 103 via the Web browser (step S3404).

Next, in step S3405, the access permission management unit 403 changes the rows of interest which are the "owner-to-instructor trust/delegation relationship" 1107 and the "owner-to-user trust/delegation relationship" 1108 on the entrustment/transfer instruction ticket management table 4033 to OK. In step S3406, the access permission management unit 403 adds a record indicating that the "owner" ABC_JP trusts the "user" SP_JP and the "instructor" SP_US to the tenant-to-tenant trust/delegation relationship management table 4034.

In step S3407, the access permission management unit 403 determines whether or not all of the "owner-to-instructor trust/delegation relationship" 1107, the "owner-to-user trust/delegation relationship" 1108, and the "user-to-instructor trust relationship" 1109 are set to OK. When all of the three relationships are set to OK, the access permission management unit 403 determines that the transfer condition is satisfied for access rights. Then, the process proceeds to step S3408 and access rights transfer processing is executed. When any one of the three relationships is set to NG, the transfer condition is not satisfied for access rights, the process ends without execution of the transfer processing. In the flow, the transfer condition is satisfied, and thus, in step S3408, the access permission management unit 403 adds a permitted right record 913 shown in FIG. 5A to the access rights management table 4031 based on the transfer instruction.

Next, a description will be given of the flow of transfer determination processing performed by the management server 103 with reference to FIGS. 25 and 26. When the user "tony" provides an instruction for executing a right transfer in step S8 shown in FIG. 17B, the management server 103 executes the transfer determination processing to be described below. In step S2901, the access permission management unit 403 starts the transfer determination processing. The access permission management unit 403 executes the transfer determination processing with reference to the corresponding record on the entrustment/transfer instruction ticket management table 4033 and other tables.

A description will be given of the processing using an instruction ticket on the record 1111 shown in FIG. 6A. In step S2902, the access permission management unit 403 determines whether or not the "user" tenant 1104 (SP_JP) can trust the "instructor" tenant 1102 (SP_US). Trust/delegation relationship determination processing is executed based on any one of the flowcharts shown in FIG. 26A or FIG. 26B. Which flowchart is used is selected by the tenant types 502 of the subject tenant and the target tenant. In this example, the subject tenant is the user tenant SP_JP, and its tenant type is a "service provider". Also, the target tenant is the instructor tenant SP_US, and its tenant type is a "service provider". Thus, trust/delegation relationship determination processing is performed by using the flowchart shown in FIG. 26A.

A description will be given of processing for determining whether or not a trust relationship is established between service providers performed by the access permission management unit 403 shown in FIG. 26A. In step S2821, the access permission management unit 403 starts processing for determining whether or not a trust relationship is established between service providers. A description will be given on the assumption that the subject SP A is SP_JP and the target SP B is SP_US. In step S2822, the access permission management unit 403 determines whether or not a direct trust relationship between SP_JP and SP_US has already been established. When a row in which the subject 1201 is SP_JP and the target 1203 is SP_US is present with reference to the tenant-to-tenant trust/delegation relationship management table 4034, the process proceeds to step S2823, and the access permission management unit 403 determines that a trust relationship exists between the SP A and the SP B. In the flow, the access permission management unit 403 adds a record indicating that the "user" trusts the "instructor" in step S3308 shown in FIG. 23. Thus, in step S2822, the access permission management unit 403 determines that a trust relationship exists between the SP A and the SP B, and the process proceeds to step S2823. When no trust relationship exists between the SP A and the SP B, the process proceeds to step S2824, and the access permission management unit 403 determines whether or not the SP B is at the level immediately above the SP A in the SP tenant hierarchy and the SP B and the SP A belong to the same group.

The access permission management unit 403 determines whether or not there is a path reaching the SP A by following the lower tenant 702 from the SP B belonging to the upper tenant 701 with reference to the tenant hierarchy management table 4023. Also, the access permission management unit 403 determines that the SP A and the SP B belong to the same group, when the belonging groups 802 to which the SP A and the SP B belongs are present and are identical, with reference to the tenant group management table 4024. If all of these results of determination are YES, the process proceeds to step S2823, and the access permission management unit 403 determines that a trust relationship exists between the SP A and the SP B. If all of these results of determination are NO, the process proceeds to step S2825.

In step S2825, the access permission management unit 403 determines whether or not an SP tenant who is at the level higher than that of the SP A in the tenant hierarchy and belongs to the same group as that of the SP A has already been established a direct trust relationship with the SP B. If YES is determined in step S2825, the process proceeds to step S2823, and the access permission management unit 403 determines that a trust relationship exists between the SP A and the SP B. If NO is determined in step S2825, the process proceeds to step S2826, and the access permission management unit 403 determines that no trust relationship exists between the SP A and the SP B.

Referring back to FIG. 25, when the access permission management unit 403 determines in step S2902 that the "user" tenant 1104 can trust the "instructor" tenant 1102, the process proceeds to step S2903. In the flow, the access permission management unit 403 determines that a trust relationship can be established between the "user" tenant 1104 and the "instructor" tenant 1102, and the process proceeds to step S2903. Then, the "user-to-instructor trust relationship" 1107 is set to OK.

When the "instructor" tenant 1102 cannot trust the "user" tenant 1104, the process proceeds to step S2904. In step S2904, there is an "intermediary" tenant (the entrustment intermediary tenant 1110) who intermediates a transfer instruction, and the access permission management unit 403 determines whether or not the "user" can trust "intermediary" and the "intermediary" can trust the "instructor". If YES is determined in step S2904, the process proceeds to step S2903, whereas if NO is determined in step S2904, the process proceeds to step S2905. In step S2905, the "user-to-instructor trust relationship" 1109 is set to NG.

Next, in step S2906, the access permission management unit 403 determines whether or not the "owner" tenant trusts the "instructor" or delegates a transfer of access rights to the "instructor". In the flow, the tenant type of the "owner" tenant ABC_JP is a customer and the tenant type of the "instructor" tenant SP_US is a service provider. Thus, the access permission management unit 403 executes determination according to the trust determination flow shown in FIG. 26B.

A description will be given of the flow of customer-to-service provider trust determination performed by the access permission management unit 403 shown in FIG. 26B. In step S2811, the access permission management unit 403 starts trust determination processing. A description will be given on the assumption that the subject customer A is ABC_JP and the target SP B is SP_US. In step S2812, the access permission management unit 403 determines whether or not a direct delegation relationship has already been established between ABC_JP and SP_US. The access permission management unit 403 determines whether or not the customer A is in a "delegation" relationship (the trust/delegation 1202) with the SP B with reference to the tenant-to-tenant trust/delegation relationship management table 4034. When the customer A is in a "delegation" relationship with the SP B, the process proceeds to step S2813, and the access permission management unit 403 determines that a delegation relationship exists between the customer A and the SP B. In the flow, "delegation" is selected by the user "suzuki" of ABC_JP using the check button shown in FIG. 13A in step S3104 shown in FIG. 21. Then, in step S3108, the access permission management unit 403 sets the customer tenant ID (ABC_JP) to which the operating user belongs to the subject 1201 shown in FIG. 6B. Also, the access permission management unit 403 sets the SP tenant ID (SP_US) specified in the permitting request/user tenant 1002 to the target 1203. Thus, the access permission management unit 403 determines that a direct delegation relationship is established between the customer A and the SP B, and the process proceeds to step S2813.

Figure 24:
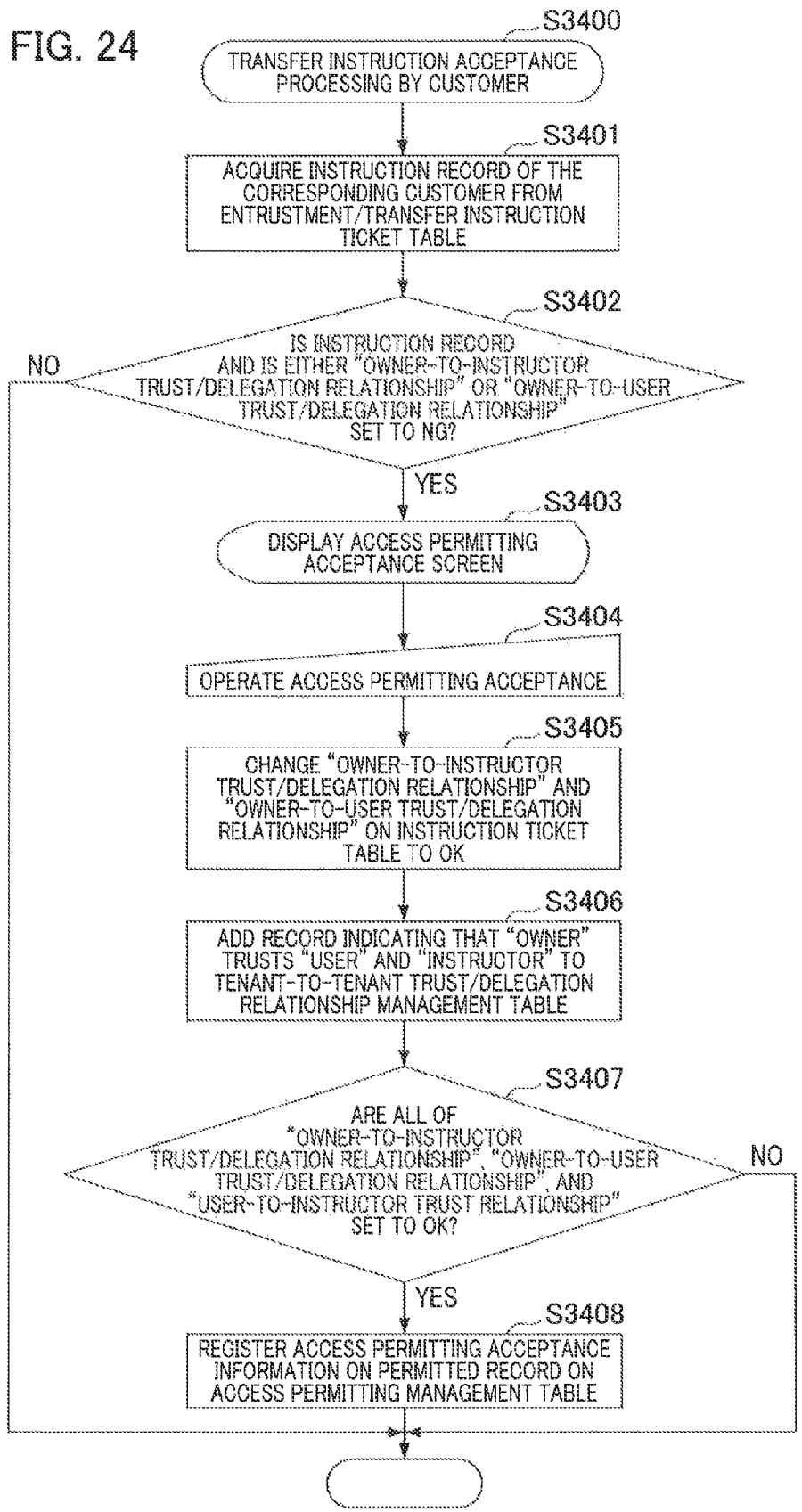
FIG. 24 is a flowchart illustrating the flow of transfer instruction acceptance processing performed by a customer.

When no direct delegation relationship is established between the customer A and the SP B, the process proceeds to step S2814, and the access permission management unit 403 determines whether or not a direct trust relationship has already been established between the customer A and the SP B. For example, when the customer tenant does not delegate a transfer of access rights to the service provider who is a transfer instructor, transfer instruction acceptance processing performed by a customer is required, and thus, the processing shown in FIG. 24 is performed. In the processing flow shown in FIG. 24, in step S3405, the access permission management unit 403 changes the rows of interest which are the "owner-to-instructor trust/delegation relationship" 1107 and the "owner-to-user trust/delegation relationship" 1108 on the entrustment/transfer instruction ticket management table 4033 to OK. In this case, the trust/delegation 1202 on the tenant-to-tenant trust/delegation relationship management table 4034 indicates "trust". Then, the process proceeds to step S2815, and the access permission management unit 403 determines that a trust relationship has already been established between the customer A and the SP B. Otherwise, the process proceeds to step S2816. In step S2816, the access permission management unit 403 determines whether or not a customer who is at the level higher than that of the customer A in the customer hierarchy has already been established a direct trust relationship with the SP B. If YES is determined in step S2816, the process proceeds to step S2815, and the access permission management unit 403 determines that a trust relationship exists between the customer A and the SP B. If NO is determined in step S2816, the process proceeds to step S2817, and the access permission management unit 403 determines that no trust relationship exists between the customer A and the SP B.

Referring back to step S2906 in FIG. 25, the access permission management unit 403 determines that the "owner" tenant (ABC_JP) delegates a transfer of access rights to the "instructor" (SP_US), and the process proceeds to step S2907. Then, the access permission management unit 403 sets the "owner-to-instructor trust/delegation relationship" 1107 and the "owner-to-user trust/delegation relationship" 1108 to OK, and the process proceeds to step S2913. When the access permission management unit 403 determines that the "owner" tenant (ABC_JP) trusts the "instructor" (SP_US), the process proceeds to step S2908. Then, only the "owner-to-instructor trust/delegation relationship" 1107 is set to OK, and the process proceeds to step S2910. In other words, when the access permission management unit 403 determines that the "owner" tenant (ABC_JP) delegates a transfer of access rights to the "instructor" (SP_US), the processing for determining whether or not the "owner" can trust the "user" in step S2910 may be omitted. When the access permission management unit 403 determines that neither a trust relationship nor a delegation relationship is established between the "owner" tenant (ABC_JP) and the "instructor" (SP_US), the process proceeds to step S2909, the "owner-to-instructor trust/delegation relationship" 1107 is set to NG, and the process proceeds to step S2910.

When the process proceeds to step S2910, the access permission management unit 403 determines whether or not the "owner" can trust the "user". For example, when the access permission management unit 403 determines in step S2906 that no delegation relationship is established between the "owner" and the "instructor", the access permission management unit 403 determines whether or not a relationship is established between the "owner" and the "instructor" using the determination method shown in FIG. 26B because the owner tenant ABC_JP is a customer tenant and the user tenant SP_JP is an SP tenant. The access permission management unit 403 checks the trust/delegation relationship management table 4034 shown in FIG. 6B so as to determine whether or not a trust relationship exists between ABC_JP and SP_JP. When the access permission management unit 403 determines that a trust relationship exists between ABC_JP and SP_JP, the process proceeds to step S2911, and the access permission management unit 403 sets the "owner-to-user trust/delegation relationship" 1108 to OK. When the access permission management unit 403 determines that no trust relationship exists between ABC_JP and SP_JP, the process proceeds to step S2912, and the access permission management unit 403 sets the "owner-to-user trust/delegation relationship" 1108 to NG.

In step S2913, the access permission management unit 403 determines whether or not all of the "owner-to-instructor trust/delegation relationship" 1107, the "owner-to-user trust/delegation relationship" 1108, and the "user-to-instructor trust relationship" 1109 are set to OK. When all of the three relationships are set to OK, the access permission management unit 403 determines that the transfer condition is satisfied for access rights. Then, the process proceeds to step S2914 and the access rights transfer processing is executed. In the flow, the access permission management unit 403 determines that the transfer condition is satisfied. When any one of the three relationships is set to NG, the transfer condition is not satisfied for access rights, the process ends without execution of the transfer processing. In step S2914, the access permission management unit 403 sets ABC_JP to the owner tenant 901, SP_JP to the user tenant 902, and "device management right" and "count/report creation right" to the permitted right 903.

As described above, according to the management device of the present invention, a service provider can entrust services to a customer tenant to another service provider, so that the customer tenant can safely transfer access rights to customer data to another service provider.

Second Embodiment

Next, a description will be given of the flow of processing for realizing access permitting and service entrustment by taking an example of the second use case. Assume that the SP tenant SP_US has made a device management service contract with the customer ABC_Corp group. SP_US needs to create an integrated report for the entire ABC_Corp group so as to provide it to ABC_Corp. ABC_AS exists at subordinates of ABC_Corp but the SP tenant SP_AS is already providing services to ABC_AS. Thus, SP_US wants to provide an integrated report creation service to ABC_AS by adding ABC_AS as a subordinate for ABC_Corp.

Figure 18A:
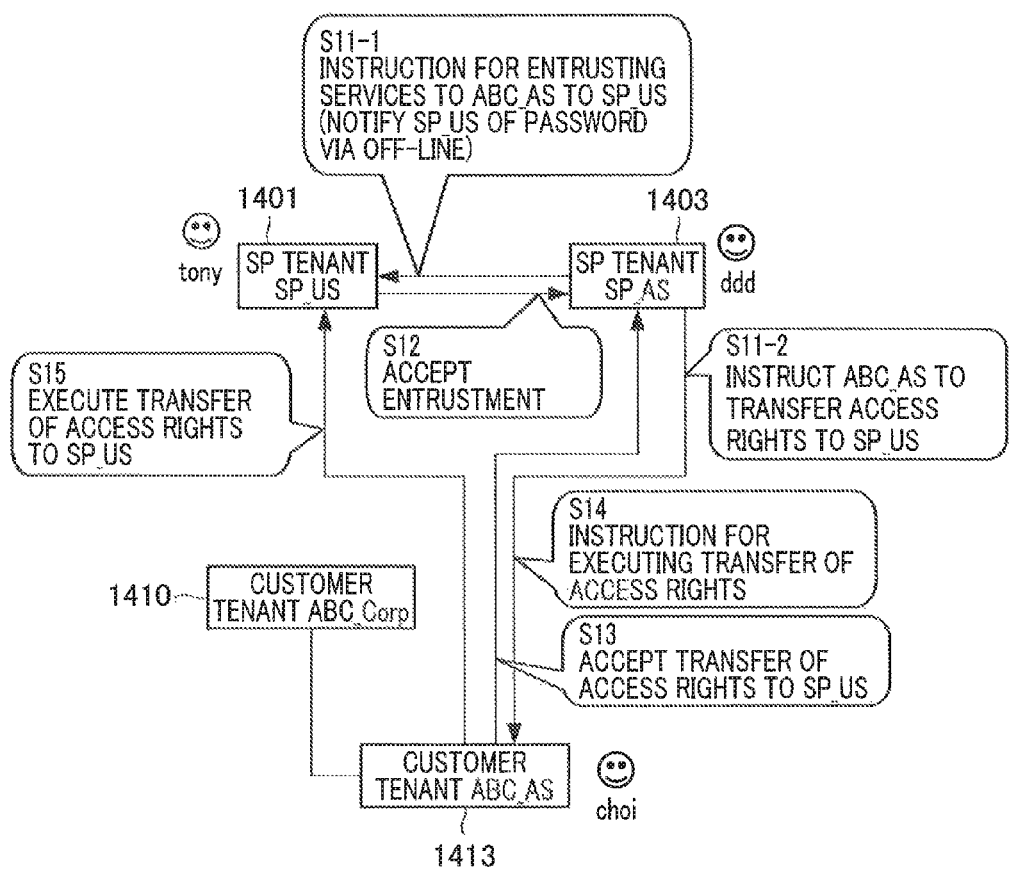
FIGS. 18A and 18B are flow diagrams illustrating entrustment/transfer acceptance processing in a second embodiment and a third embodiment.

FIG. 18A is a diagram illustrating the flow of processing performed until the SP tenant SP_AS obtains an access permission by entrusting services to the customer tenant ABC_AS to the SP tenant SP_US. Reference numeral 1401 denotes the SP tenant SP_US, reference numeral 1403 denotes the SP tenant SP_AS, reference numeral 1410 denotes the customer tenant ABC_Corp, and reference numeral 1413 denotes the customer tenant ABC_AS.

In FIG. 18A, the flow of processing performed until SP_US obtains an access permission by creating an ABC_Corp tenant and registering it on the device management service unit and the flow of processing performed until SP_AS obtains an access permission by creating an ABC_AS and registering it on the device management service unit are omitted. The flow of processing until step S11 is reached is the same as that described with reference to FIG. 17A.

Firstly, when the user of SP_AS performs an entrustment operation for entrusting services to the customer tenant ABC_AS to the SP tenant SP_US in step S11-1, the user of SP_AS simultaneously provides an instruction for transferring access rights to SP_US to ABC_AS in step S11-2. When SP_AS provides an entrustment/transfer instruction, a record 1114 on the entrustment/transfer instruction ticket management table 4033 shown in FIG. 6A is used. In other words, the target rights are device management, count/report creation, and integrated report creation. Next, in step S12, the user of the SP tenant SP_US performs an entrustment acceptance operation. Next, in step S13, the user of the customer tenant ABC_AS accepts a transfer of access rights to SP_US. When a transfer condition for transferring access rights is satisfied as a result of these operations, an access rights transfer execution instruction is provided in step S14, and processing for transferring access rights from ABC_AS to SP_US is executed in step S15.

The entrustment operation in step S11 is substantially the same as that in step S5-2 shown in FIG. 17B but differs from that in step S5-2 in the following points. On the to-be-entrusted service 2305 on the service entrustment setting screen 2300 shown in FIG. 15, the user of SP_AS selects integrated report creation in addition to device management and count/report creation. In other words, the entrustment operation in step S11 differs from that in step S5-2 in that the user of SP_AS provides an instruction for entrusting an integrated report creation right service to ABC_AS to SP_US. The entrustment acceptance operation in step S12 is the same as that in step S6 shown in FIG. 17B. A user operation for ABC_AS becomes unnecessary for accepting a transfer of access rights to SP_US in step S13 because the customer tenant ABC_AS trusts SP_AS. Thus, the owner-to-instructor trust/delegation relationship 1107 is set to OK. Furthermore, ABC_Corp who is at the level higher than that of ABC_AS in the customer hierarchy has already been established a direct trust relationship with SP_US. It is determined as YES in step S2816 and that a trust relationship exists between ABC_AS and SP_US in the trust relationship determination shown in FIG. 26B. Thus, the owner-to-user trust/delegation relationship 1108 is also determined to be OK. Consequently, when the user of SP_US performs an entrustment acceptance operation in step S12, the transfer condition is satisfied for access rights, and thus, the access rights transfer processing in steps S14 and S15 is executed.

Third Embodiment

Next, a description will be given of the flow of processing for realizing service entrustment via an intermediary by taking an example of the third use case. Assume that the SP tenant SP_US has made a device management service contract with the customer ABC_Corp group. SP_US needs to create an integrated report for the entire ABC_Corp group so as to provide it to ABC_Corp. ABC_London exists at subordinates of ABC_Corp but SP_US cannot directly provide services to ABC_London. Thus, SP_US wants to perform service entrustment but does not know a service provider who can provide services to ABC_London. Thus, when no service provider is specified, SP_US wants to entrust services to ABC_London to SP_London at subordinates of ABC_Corp by providing a service entrustment intermediating instruction to SP_UK which is a third service providing device.

Figure 18B:
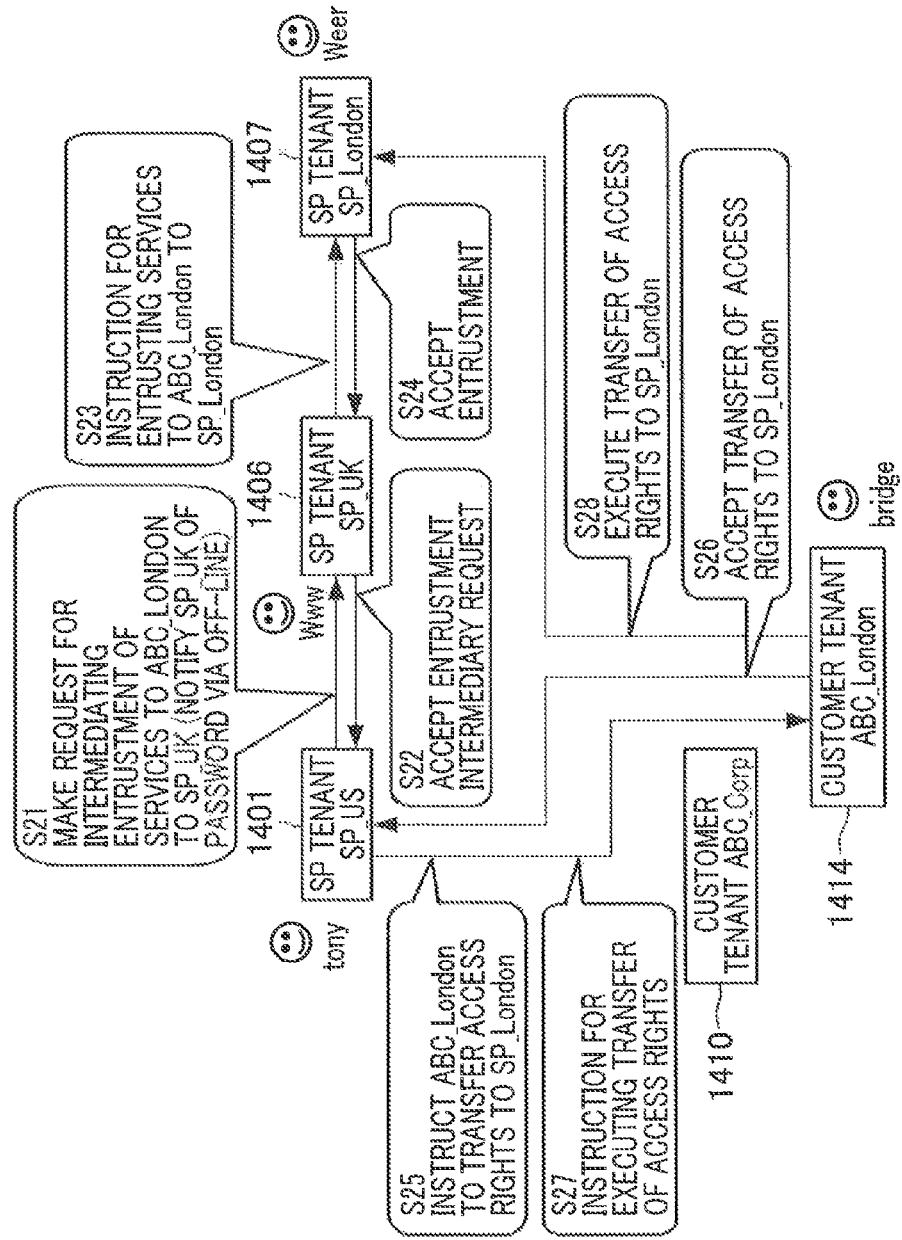

FIG. 18B is a diagram illustrating the flow of processing performed until SP_London obtains an access permission from ABC_London after the SP tenant SP_US makes a request for entrusting services to the customer tenant ABC_London to the SP tenant SP_UK. As in FIG. 18A, the flow of processing performed until SP_US obtains an access permission from ABC_London by creating an ABC_London tenant is omitted.

Firstly, in step S21, the user "tony" of SP_US makes a service entrustment intermediary request for intermediating the entrustment of services to the customer tenant ABC_London to SP_UK. The service entrustment intermediary operation is started when the "add service entrustment intermediary" button 2218 is pressed on the service entrustment management screen shown in FIG. 14A. The service entrustment intermediary setting screen is substantially the same as the service entrustment setting screen 2300 shown in FIG. 15 but differs from the service entrustment setting screen 2300 shown in FIG. 15 in the following points. In other words, the screen for inputting service entrustment intermediary service provider tenant information instead of entrustee service provider tenant information is displayed. Here, the user of SP_US specifies ABC_London on the customer tenant ID 2301 to be entrusted and input SP_UK information to entrustment intermediary service provider information. The user of SP_US sets up entrustment service information and presses a setting button. Then, an instruction record 1113 is added to the entrustment/transfer instruction ticket management table. SP_US is set to the instructor 1102, ABC_London is set to the owner 1103, and null is set to the user 1104. Also, SP_UK is set to the entrustment intermediary tenant 1107.

When the user of SP_UK displays the service entrustment management screen, a customer list is displayed in a row 2242 at the bottom of FIG. 14B. When a tenant to which the login user belongs is present on the entrustment intermediary tenant 1107 on the entrustment/transfer instruction ticket management table 4033, the fact that the entrustment intermediary has been requested is displayed on the entrusted service 2225. When the user of SP_UK presses an accept button 2228, the screen is transitioned to the service entrustment acceptance screen 2400 shown in FIG. 16, the user of SP_UK inputs a pass phrase reported from SP_US via an external system so that the user of SP_UK can accept the service entrustment intermediary request in step S22.

Next, in step S23, the user of SP_UK entrusts services to SP_London. As in normal service entrustment, an operation for entrusting services to SP_London by SP_UK is performed on the service entrustment setting screen 2300 which has been transitioned from the "add service entrustment" button 2217 on the service entrustment management screen 2200. The user of SP_UK specifies ABC_London on the customer tenant ID 2301 to be entrusted and specifies SP_London on the entrustee's service provider tenant ID 2302. A pass phrase reported from SP_US via an external system is input to the pass phrase 2304. When the setting button 2306 is pressed, SP_London specified in the entrustee's service provider tenant ID 2302 is set to the row of interest which is the user 1104 on the entrustment/transfer instruction ticket management table 4033. Consequently, the setting is made as shown in a row 1113. The state is obtained as a result of execution of the entrustment instruction processing shown in FIG. 22 up until step S3204.

Next, in step S24, the user of SP_London accepts entrustment. The flowchart of entrustment instruction acceptance processing is the same as that shown in FIG. 23. In step S25, the user of SP_US provides a transfer instruction for a transfer of access rights to SP_London to ABC_London as a consequence of acceptance of entrustment by the user of SP_London. The transfer instruction acceptance processing is the same as that in the flowchart shown in FIG. 24.

Figure 20A:
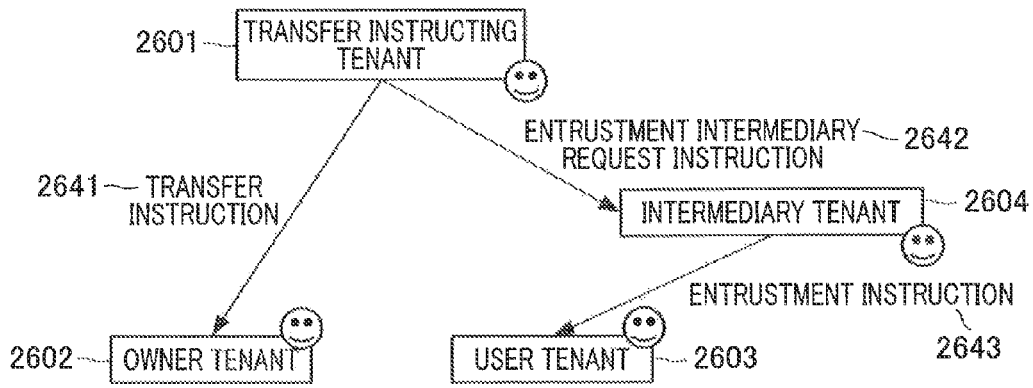
FIGS. 20A and 20B are conceptual diagrams illustrating a transfer/entrustment instruction and a transfer determination condition in the third embodiment.

A description will be given of a transfer determination condition including intermediary for entrustment with reference to a conceptual diagram. FIG. 20A is a conceptual diagram illustrating a service entrustment instruction, an intermediary request, and a right transfer instruction. Reference numeral 2601 denotes an instructor tenant which indicates a tenant who has provided an instruction (2642) for service entrustment to a customer tenant. In the third embodiment, the instructor tenant 2601 corresponds to the SP tenant SP_US. Reference numeral 2602 denotes an owner tenant which indicates a customer tenant who is the owner of data. The owner tenant 2602 is a tenant who attempts to transfer access rights to data to the user tenant 2603 upon receiving a transfer instruction from the instructor tenant 2601. In the third embodiment, the owner tenant 2602 corresponds to the customer tenant ABC_London.

Reference numeral 2604 denotes an intermediary tenant which indicates a tenant who attempts to specify the user tenant as a service entrustee upon receiving a service entrustment intermediary request instruction (2642) from the instructor tenant 2601. Reference numeral 2603 denotes a user tenant who attempts to provide services to the owner tenant upon receiving a service entrustment instruction from the intermediary tenant 2604.

The user tenant 2603 does not receive an instruction directly from the instructor tenant 2601. However, the user tenant 2603 undertakes (is entrusted) to provide services to the owner tenant 2602 from the intermediary tenant 2604. Thus, the user tenant 2603 cannot undertake service provision as long as the user tenant 2603 cannot trust the intermediary tenant 2604. Also, the intermediary tenant 2604 does not provide services to the owner tenant 2602 but performs service entrustment to the user tenant 2603. Thus, the intermediary tenant 2604 cannot intermediate service entrustment as long as the intermediary tenant 2604 cannot trust the instructor tenant 2601.

Figure 20B:
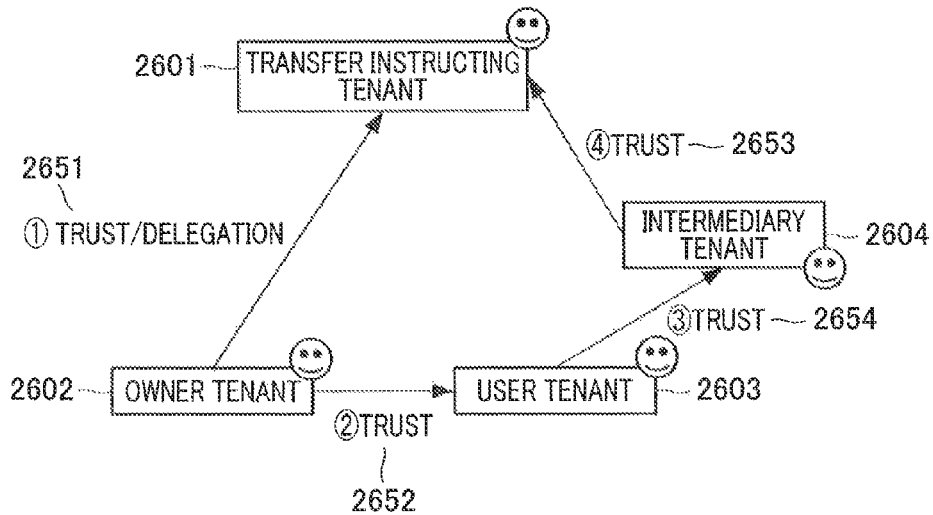

The transfer determination conditions are shown in FIG. 20B. When the illustrated four trust relationships 2651, 2652, 2653, and 2654 are established, a right transfer instruction given by the instructor tenant 2601 and the intermediary tenant is executed. The owner tenant 2602 trusts the instructor tenant 2601 or delegates a transfer of access rights to the instructor tenant 2601 as shown by reference numeral 2651. The owner tenant 2602 trusts the user tenant 2603 as shown by reference numeral 2652 (to be omittable when the owner tenant delegates a transfer of access rights to the instructor tenant). The user tenant 2603 trusts the intermediary tenant 2604 as shown by reference numeral 2654. The intermediary tenant 2604 trusts the instructor tenant 2601 as shown by reference numeral 2653.

In the third embodiment, since a trust relationship denoted by reference numeral 2651 is established between ABC_London and SP_US upon execution of access permitting acceptance, it is determined that a trust relationship exists between ABC_London and SP_US. The owner-to-instructor trust/delegation relationship 1107 is set to OK. Since there is no trust relationship denoted by reference numeral 2652, the owner-to-user trust/delegation relationship 1108 is set to NG. In other words, the transfer acceptance operation by the customer becomes necessary, and thus, the processing shown in FIG. 24 is performed. Since SP_UK is at the level higher than that of SP_London in the SP tenant hierarchy and SP_UK and SP_London belong to the same group, it is determined that a trust relationship denoted by reference numeral 2654 exists between SP_UK and SP_London. In a trust relationship denoted by reference numeral 2653, a service entrustment intermediary acceptance operation becomes necessary, and thus, the intermediary acceptance processing in step S22 is performed. When the intermediary acceptance processing in step S22 is performed, the trust relationship denoted by reference numeral 2653 is satisfied, and thus, the user-to-instructor trust relationship 1109 is set to OK.

Next, the user of the customer tenant ABC_London accepts a transfer of access rights to SP_London in step S26. The operation method is the same as the processing in step S8 shown in FIG. 17B and its explanation will be omitted. When a transfer condition for transferring access rights is satisfied as a result of these operations, an access rights transfer execution instruction is provided in step S27, and processing for transferring access rights from ABC_London to SP_London is executed in step S28.

As described above, according to the management device of the present invention, even when a service provider does not know another service provider serving as a service entrustee, the service provider can safely entrust another service provider to provide services to customers via an intermediary provider.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-076533, filed on Apr. 2, 2013 which is hereby incorporated by reference herein in its entirety.

What is claimed is:

1. A management device that is communicable with a holding device and a plurality of service providing devices for providing services using resources to the holding device and manages access rights to the resources relating to the service providing devices, the management device comprising a memory and a processor in communication with the memory, the processor configured to control:
   a managing unit configured to manage trust relationship information between the plurality of service providing devices and trust relationship information between the holding device and the service providing devices;
   a creating unit configured to create a subordinate customer tenant, which subordinates to a customer tenant, to the holding device; and
   a setting unit configured to set a transfer of access rights for the subordinate customer tenant of the holding device held by a first service providing device to a second service providing device,
   wherein the setting unit determines that the second service providing device trusts the first service providing device in accordance with a transmission of an entrustment acceptance from the second service providing device to the first service providing device, and manages first trust relationship information as a mutual trust relationship is established,
   wherein the setting unit determines that the holding device trusts the first service providing device in accordance with a transmission of access permitting information from the holding device, which has the created subordinate customer tenant, to the first service providing device according to an access permitting instruction provided by a customer of the subordinate customer tenant, and manages second trust relationship information as a mutual trust relationship is established,
   wherein the setting unit determines that the holding device trusts the second service providing device in accordance with a transmission of transfer acceptance information from the holding device, which has the created subordinate customer tenant, to the first service providing device according to a transfer acceptance instruction provided by the first service providing device, and manages third trust relationship information as a mutual trust relationship is established, and
   wherein, if the setting unit determines, based on the first, second and third trust relationship information, that the trust relationship between the first and second service providing devices and the trust relationship between the holding device and the first and second service providing devices exists, the setting unit sets the transfer of the access rights.

2. The management device according to claim 1, wherein the second trust relationship information includes information indicating a trust relationship or a delegation relationship between devices, and
   wherein, when the second trust relationship information indicates that the holding device delegates the transfer of the access rights, when the first service providing device entrusts services to the holding device to the second service providing device, to the first service providing device, the setting unit sets the transfer of the access rights without determining whether or not the holding device trusts the second service providing device.

3. The management device according to claim 1, further comprising:
   a transmission unit configured to transmit an entrustment screen to the second service providing device for the second service providing device to entrust services provided by the first service providing device and transmit a transfer screen to the holding device for the holding device to transfer access rights to the second service providing device,
   wherein the setting unit determines that the second service providing device trusts the first service providing device when the second service providing device accepts entrustment via the entrustment screen, and determines that the holding device trusts the second service providing device when the holding device accepts transfer via the transfer screen.

4. The management device according to claim 3, wherein the managing unit further manages hierarchical structure information indicating a hierarchical structure between the holding devices and a hierarchical structure between the service providing devices, and
   wherein, when the second service providing device accepts entrustment via the entrustment screen or when the first service providing device is positioned in a level higher than that of the second service providing device, the setting unit determines that the second service providing device trusts the first service providing device.

5. The management device according to claim 4, wherein, when the holding device further delegates the transfer of the access rights to the first service providing device via the transfer screen, the setting unit sets the transfer of the access rights without determining whether or not the holding device trusts the second service providing device, and
   wherein, when the holding device accepts transfer via the transfer screen or when there is a holding device positioned in a level higher than that of the holding device and the fact that the holding device positioned in a higher level trusts the first service providing device is included in the second trust relationship information, the setting unit determines that the holding device trusts the first service providing device.

6. A management system that comprises a management device which is communicable with a holding device and a first service providing device for providing services using resources to the holding device and manages access rights to the resources relating to the service providing device,
   wherein the management device comprises a memory and a processor in communication with the memory, and the processor is configured to control:

a managing unit configured to acquire trust relationship information from the holding device and the service providing device and manage trust relationship information between the first service providing device and other service providing devices and trust relationship information between the holding device and the first service providing device;

a creating unit configured to create a subordinate customer tenant, which subordinates to a customer tenant, to the holding device; and a setting unit configured to set a transfer of access rights for the subordinate customer tenant of the holding device held by the first service providing device to a second service providing device, wherein the first service providing device comprises a memory and a processor in communication with the memory, and the processor is configured to control:

an entrustment instructing unit configured to entrust services provided by the first service providing device to the second service providing device; and a transfer instructing unit configured to cause the subordinate customer tenant to transfer the access rights for the subordinate customer tenant of the holding device to the second service providing device, and wherein the management device determines that the second service providing device trusts the first service providing device in accordance with a transmission of an entrustment acceptance from the second service providing device to the first service providing device, and manages first trust relationship information as a mutual trust relationship is established, wherein the management device determines that the holding device trusts the first service providing device in accordance with a transmission of access permitting information from the holding device, which has the created subordinate customer tenant, to the first service providing device according to an access permitting instruction provided by a customer of the subordinate customer tenant, and manages second trust relationship information as a mutual trust relationship is established, wherein the management device determines that the holding device trusts the second service providing device in accordance with a transmission of transfer acceptance information from the holding device, which has the created subordinate customer tenant, to the first service providing device according to a transfer acceptance instruction provided by the first service providing device, and manages third trust relationship information as a mutual trust relationship is established, and wherein, if the setting unit determines, based on the first, second, and third trust relationship information, that the trust relationship between the service providing devices and the trust relationship between the holding device and the service providing devices exists, the setting unit sets the transfer of the access rights.

7. The management system according to claim 6, wherein the first service providing device further comprises an intermediary instructing unit configured to instruct a third service providing device to intermediate entrustment of services provided by the first service providing device when the second service providing device is not specified, wherein the transfer instructing unit provides a transfer instruction to the holding device as a consequence of acceptance of entrustment by the second service providing device based on the intermediary instruction, and wherein the setting unit sets the transfer of the access rights when the holding device accepts the transfer instruction.

8. A control method of a management device that is communicable with a holding device and a plurality of service providing devices for providing services using resources to the holding device and manages access rights to the resources relating to the service providing devices, the control method comprising:

managing trust relationship information between the plurality of service providing devices and trust relationship information between the holding device and the service providing devices;

creating a subordinate customer tenant, which subordinates to a customer tenant, to the holding device; and setting a transfer of access rights for the subordinate customer tenant of the holding device held by a first service providing device to a second service providing device, wherein it is determined in the setting step that the second service providing device trusts the first service providing device in accordance with a transmission of an entrustment acceptance from the second service providing device to the first service providing device, and first trust relationship information is managed as a mutual trust relationship is established, wherein it is determined in the setting step that the holding device trusts the first service providing device in accordance with a transmission of access permitting information from the holding device, which has the created subordinate customer tenant, to the first service providing device according to an access permitting instruction provided by a customer of the subordinate customer tenant, and manages second trust relationship information as a mutual trust relationship is established, wherein it is determined in the setting step that the holding device trusts the second service providing device in accordance with a transmission of transfer acceptance information from the holding device, which has the created subordinate customer tenant, to the first service providing device according to a transfer acceptance instruction provided by the first service providing device, and manages third trust relationship information as a mutual trust relationship is established, and wherein, if it is determined, based on the first, second, and third trust relationship information, that the trust relationship between the plurality of service providing devices and the trust relationship between the holding device and the service providing devices exists, the transfer of the access rights is set in the setting step.

9. A non-transitory storage medium on which is stored a computer program for making a computer execute a control method of a management device that is communicable with a holding device and a plurality of service providing devices for providing services using resources to the holding device and manages access rights to the resources relating to the service providing devices, the control method comprising:

managing trust relationship information between the plurality of service providing devices and trust relationship information between the holding device and the service providing devices;

creating a subordinate customer tenant, which subordinates to a customer tenant, to the holding device; and setting a transfer of access rights for the subordinate customer tenant of the holding device held by a first service providing device to a second service providing device, wherein it is determined in the setting step that the second service providing device trusts the first service providing device in accordance with a transmission of an entrustment acceptance from the second service providing device to the first service providing device, and first trust relationship information is managed as a mutual trust relationship is established, wherein it is determined in the setting step that the holding device trusts the first service providing device in accordance with a transmission of access permitting information from the holding device, which has the created subordinate customer tenant, to the first service providing device according to an access permitting instruction provided by a customer of the subordinate customer tenant, and manages second trust relationship information as a mutual trust relationship is established, wherein it is determined in the setting step that the holding device trusts the second service providing device in accordance with a transmission of transfer acceptance information from the holding device, which has the created subordinate customer tenant, to the first service providing device according to a transfer acceptance instruction provided by the first service providing device, and manages third trust relationship information as a mutual trust relationship is established, and wherein, if it is determined, based on the first, second, and third trust relationship information, that the trust relationship between the plurality of service providing devices and the trust relationship between the holding device and the service providing devices exists, the transfer of the access rights is set in the setting step.

* * * * *